（12） United States Patent
Zhang et al.

US011159089B2

(10) Patent No.: US 11,159,089 B2
(45) Date of Patent: *Oct. 26, 2021

(54) RESONANT CONVERTER, RESONANT CONVERTER CONTROL METHOD, AND SYSTEM

(71) Applicant: HUAWEI TECHNOLOGIES CO., LTD., Guangdong (CN)

(72) Inventors: Yanzhong Zhang, Shanghai (CN); Zheng Ma, Xi'an (CN); Lei Shi, Shanghai (CN); Dianbo Fu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/911,023

(22) Filed: Jun. 24, 2020

(65) Prior Publication Data
US 2020/0321879 A1 Oct. 8, 2020

Related U.S. Application Data

(63) Continuation of application No. PCT/CN2018/119386, filed on Dec. 5, 2018.

(30) Foreign Application Priority Data

Dec. 25, 2017 (CN) .................... 201711418706.X

(51) Int. Cl.
*H02M 3/335* (2006.01)
*H02M 1/08* (2006.01)
*H02M 3/00* (2006.01)

(52) U.S. Cl.
CPC ....... *H02M 3/33569* (2013.01); *H02M 1/083* (2013.01); *H02M 3/01* (2021.05)

(58) Field of Classification Search
CPC .............................................. H02M 3/335–42
See application file for complete search history.

(56) References Cited

U.S. PATENT DOCUMENTS 9,281,753 B2 3/2016 Reddy
2014/0198536 A1 7/2014 Fu et al.
(Continued)

FOREIGN PATENT DOCUMENTS

CN 1387306 A 12/2002
CN 101728961 A 6/2010
(Continued)

*Primary Examiner* — Peter M Novak
(74) *Attorney, Agent, or Firm* — Womble Bond Dickinson (US) LLP

(57) ABSTRACT

A resonant converter includes: an input power supply, a bleeder circuit, a multi-level switching network, a resonant unit, and a transformer. The input power supply is connected to the bleeder circuit, the multi-level switching network is connected to the bleeder circuit, a clamping middle point of the multi-level switching network is connected to a middle point of the bleeder circuit; one end of the resonant unit is connected to the output terminal of the multi-level switching network, and the other end of the resonant unit is connected to one end of a primary side of the transformer; and the multi-level switching network instructs the output terminal of the multi-level switching network to output a square wave voltage with different amplitudes, to serve as an input voltage of the resonant unit, where the input voltage is used to adjust a gain of the resonant converter.

11 Claims, 11 Drawing Sheets

(56) References Cited

U.S. PATENT DOCUMENTS

2015/0155770 A1    6/2015   Ying et al.
2019/0181744 A1*   6/2019   Cohen .................. H02M 3/285

FOREIGN PATENT DOCUMENTS

| | | |
|---|---|---|
| CN | 201541200 U | 8/2010 |
| CN | 102820801 A | 12/2012 |
| CN | 103560674 A | 2/2014 |
| CN | 104682736 A | 6/2015 |
| CN | 106533232 A | 3/2017 |
| CN | 106921306 A | 7/2017 |
| CN | 108258909 A | 7/2018 |
| CN | 108566094 A | 9/2018 |
| JP | 2015027169 A | 2/2015 |
| WO | 2016016475 A1 | 2/2016 |
| WO | WO-2018171782 A1 * | 9/2018 |

* cited by examiner

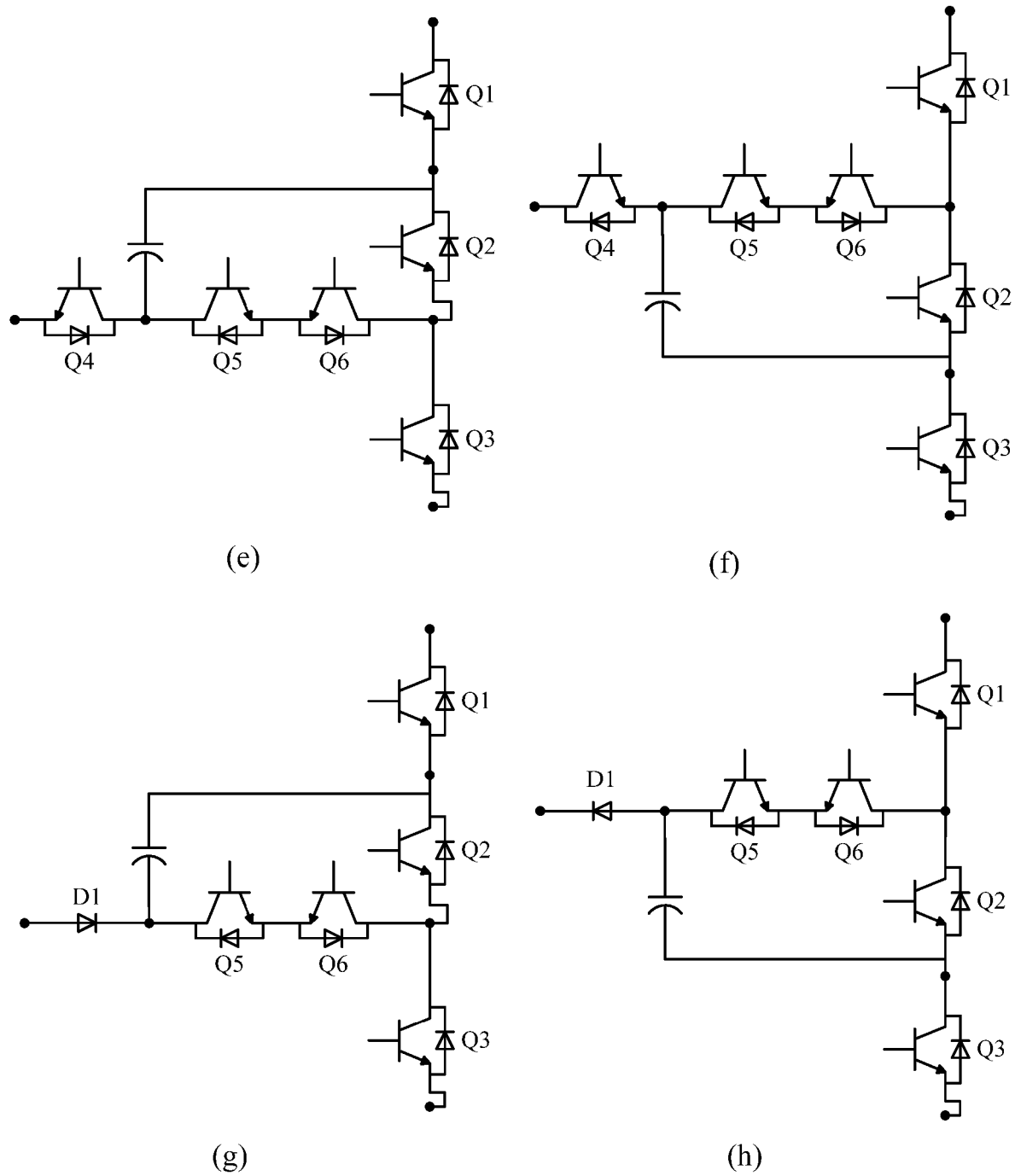
FIG. 5 (Con't.)

RESONANT CONVERTER, RESONANT CONVERTER CONTROL METHOD, AND SYSTEM

CROSS-REFERENCE TO RELATED APPLICATIONS

This application is a continuation of International Application No. PCT/CN2018/119386, filed on Dec. 5, 2018, which claims priority to Chinese Patent Application No. 201711418706.X, filed on Dec. 25, 2017. The disclosures of the aforementioned applications are hereby incorporated by reference in their entireties.

TECHNICAL FIELD

This application relates to the field of DC-DC converter circuit technologies, and particularly, to a resonant converter, a resonant converter control method, and a system.

BACKGROUND

A DC-DC converter circuit converts a non-adjustable direct current voltage into an adjustable or fixed direct current voltage, and controls electric energy through switching regulation. This technology applies to various switch-mode power supplies, direct current speed regulation, fuel cells, solar power, and distributed power systems.

An Inductor-Inductor-Capacitor (LLC) resonant converter can implement Zero Voltage Switch (ZVS) soft switching with a primary side switching transistor, can implement Zero Current Switch (ZCS) soft switching with a secondary side rectifier diode, and has advantages such as low switching losses and high efficiency. Therefore, LLC resonant converters are widely used in DC-DC converter circuits.

The LLC resonant converter controls an output voltage by adjusting a switching frequency, and therefore switches an output voltage gain through frequency adjustment. When a wide output voltage range is needed, the resonant converter works at a very wide frequency range. In particular, when a small output voltage gain is needed, a working frequency of the resonant converter is far greater than a resonance frequency. In this case, the primary side switching transistor has a higher switching loss, and ZCS is disabled in the secondary side rectifier diode. As a result, system efficiency is significantly reduced, which in turn affects load capacity of the resonant converter.

SUMMARY

Embodiments of this application provide a resonant converter which adjusts a gain by adjusting an input voltage of a resonant unit through a multi-level switching network, with no need to excessively increase a frequency of the resonant unit. Therefore, impact of an excessively high working frequency on the resonant converter can be reduced, and efficiency and load capacity of the resonant converter can be improved. The embodiments of this application further provide a corresponding power conversion system, resonant converter control method, and storage medium.

A first aspect of this application provides a resonant converter, including: an input power supply, a bleeder circuit, a multi-level switching network, a resonant unit, and a transformer, where the resonant converter may further include a rectifier filter circuit, and a positive electrode and a negative electrode of the input power supply are respectively connected to two ends of the bleeder circuit, and the bleeder circuit is configured to divide a direct current voltage that is input by the input power supply; two input terminals of the multi-level switching network are respectively connected to the two ends of the bleeder circuit, a clamping middle point of the multi-level switching network is connected to a middle point of the bleeder circuit, and a quantity of output levels at an output terminal of the multi-level switching network is greater than 3; one end of the resonant unit is connected to the output terminal of the multi-level switching network, and the other end of the resonant unit is connected to one end of a primary side of the transformer; the other end of the primary side of the transformer is connected to the middle point of the bleeder circuit; the multi-level switching network works in different working modes or in different working manners of one working mode according to control instructions of a control apparatus, where the control instruction is given by the control apparatus based on a working parameter of the resonant converter, and the control apparatus is located in a power conversion system including the resonant converter. Therefore, the control apparatus may be included in the resonant converter, or not located in the resonant converter; and the output terminal of the multi-level switching network outputs square wave voltages with different amplitudes in the different working modes or in the different working manners of one working mode, to serve as input voltages of the resonant unit, where the input voltage is used to adjust a gain of the resonant converter. It can be learned from the first aspect that in the resonant converter, the multi-level switching network is placed in front of the resonant unit, the multi-level switching network can adjust the input voltage of the resonant unit, and a decrease in the input voltage of the resonant unit inevitably results in a decrease in an output voltage of the entire resonant converter. Such a process is to adjust the final output voltage by adjusting the input voltage of the resonant unit, with no need to significantly adjust a switching frequency of the resonant converter. Therefore, when the output voltage of the resonant converter is relatively low, the resonant converter can still work around a resonance frequency, thereby reducing semiconductor switching losses under low voltage output, and improving a conversion efficiency and load capacity of the resonant converter under low voltage output.

With reference to the first aspect, in one embodiment, the bleeder circuit includes a capacitor C1 and a capacitor C2 that are connected in series, and the C1 and the C2 equally share a voltage of the input power supply E; the multi-level switching network includes a switching transistor Q1, a switching transistor Q2, a switching transistor Q3, a switching transistor Q4, a bilateral switch, and a capacitor C3, and the bilateral switch includes at least one of a first bilateral switch and a second bilateral switch; the Q1, the Q2, the Q3, and the Q4 are sequentially connected in series in a same direction, and the Q1, the Q2, the Q3, and the Q4 in series are connected between the positive electrode and the negative electrode of the input power supply; the first bilateral switch includes a semiconductor transistor Q5 and a switching transistor Q6 that are connected in reverse series, and the second bilateral switch includes a switching transistor Q7 and a semiconductor transistor Q8 that are connected in reverse series; one end of the first bilateral switch is connected to a connection point between the Q1 and the Q2, and the other end of the first bilateral switch is connected to the middle point of the bleeder circuit; one end of the second bilateral switch is connected to a connection point between the Q3 and the Q4, and the other end of the second bilateral switch is connected to the middle point of the bleeder circuit; a positive electrode of the C3 is connected to the connection point between the Q1 and the Q2, and a negative electrode of the C3 is connected to the connection point between the Q3 and the Q4; and a connection point between the Q2 and the Q3 serves as the output terminal of the multi-level switching network to connect to the one end of the resonant unit, and a voltage between the two ends of the C3 is E/4. It can be learned from one embodiment of the first aspect that when a structure of the multi-level switching network is formed by a plurality of switching transistors, different switching transistors can be effectively controlled to be on or off according to different requirements, and in turn the multi-level switching network can output voltages with different amplitudes.

With reference to the first aspect, in one embodiment, when the Q5 is a switching transistor, an emitter of the Q5 is connected to an emitter of the Q6, and a collector of the Q5 is connected to the middle point of the bleeder circuit; when the Q5 is a diode, an anode of the Q5 is connected to an emitter of the Q6, and a cathode of the Q5 is connected to the middle point of the bleeder circuit; when the Q8 is a switching transistor, an emitter of the Q8 is connected to an emitter of the Q7, and a collector of the Q8 is connected to the negative electrode of the C3; or when the Q8 is a diode, an anode of the Q8 is connected to an emitter of the Q7, and a cathode of the Q8 is connected to the negative electrode of the C3. It can be learned from one embodiment of the first aspect that regardless of a switching transistor or a diode, switching control can be implemented through effective configuration according to requirements, reflecting diversified structures of the multi-level switching network.

With reference to the first aspect, in one embodiment, the bleeder circuit includes a capacitor C1 and a capacitor C2 that are connected in series, and the C1 and the C2 equally share a voltage of the input power supply E; and when the quantity of output levels of the multi-level switching network is 5, the multi-level switching network includes: a first bridge arm, a second bridge arm, and a capacitor C3, where the first bridge arm includes a switching transistor Q1, a switching transistor Q2, a switching transistor Q3, and a switching transistor Q4, and the second bridge arm includes a switching transistor Q5, a switching transistor Q6, a switching transistor Q7, and a switching transistor Q8; the Q1, the Q2, the Q3, and the Q4 are sequentially connected in series in a same direction, the Q1, the Q2, the Q3, and the Q4 in series are connected between the positive electrode and the negative electrode of the input power supply, a connection point between the Q1 and the Q2 is a first connection point, a connection point between the Q2 and the Q3 is a second connection point, a connection point between the Q3 and the Q4 is a third connection point, and the second connection point is connected to the middle point of the bleeder circuit; the Q5, the Q6, the Q7, and the Q8 are sequentially connected in series in a same direction, and the Q5, the Q6, the Q7, and the Q8 in series are connected between the first connection point and the third connection point; and a connection point between the Q6 and the Q7 serves as the output terminal of the multi-level switching network to connect to the one end of the resonant unit, a positive electrode of the C3 is connected to a connection point between the Q5 and the Q6, a negative electrode of the C3 is connected to a connection point between the Q7 and the Q8, and a voltage between the two ends of the C3 is E/4. It can be learned from one embodiment of the first aspect that the structure of the multi-level switching network can be implemented by using different designs, provided that the output terminal of the multi-level switching network can output more than three levels.

With reference to the first aspect, in one embodiment, when the quantity of output levels is 5, the five output levels include E/2, E/4, 0, –E/4, and –E/2; the five output levels are combined to form 10 square wave voltages with different amplitudes; and the 10 square wave voltages with different amplitudes are included in four working modes, and square wave voltages in different working manners of one working mode have a same level difference between amplitudes. It can be learned from one embodiment of the first aspect that when the multi-level switching network can output five levels, a plurality of working modes can be controlled, so that an output voltage at the output terminal of the multi-level switching network can be controlled through mode selection.

With reference to the first aspect, in one embodiment, the bleeder circuit includes a capacitor C1 and a capacitor C2 that are connected in series, and the C1 and the C2 equally share a voltage of the input power supply E; and the multi-level switching network includes a switching transistor Q1, a switching transistor Q2, a switching transistor Q3, a semiconductor transistor, a bilateral switch, and a capacitor C3, where the Q1, the Q2, and the Q3 are sequentially connected in series in a same direction, and the Q1, the Q2, and the Q3 in series are connected between the positive electrode and the negative electrode of the input power supply; one end of the bilateral switch is connected to a connection point between the Q2 and the Q3, and the other end of the bilateral switch is connected to a negative electrode of the C3; a positive electrode of the C3 is connected to a connection point between the Q1 and the Q2; and when the semiconductor transistor is a switching transistor Q4, a collector of the Q4 is connected to the negative electrode of the C3, and an emitter of the Q4 is connected to the middle point of the bleeder circuit, or when the semiconductor is a diode, an anode of the diode is connected to the middle point of the bleeder circuit, and a cathode of the diode is connected to the negative electrode of the C3; or one end of the bilateral switch is connected to a connection point between the Q1 and the Q2, and the other end of the bilateral switch is connected to a positive electrode of the C3; a negative electrode of the C3 is connected to a connection point between the Q2 and the Q3; and when the semiconductor transistor is a switching transistor Q4, an emitter of the Q4 is connected to the positive electrode of the C3, and a collector of the Q4 is connected to the middle point of the bleeder circuit, or when the semiconductor is a diode, an anode of the diode is connected to the positive electrode of the C3, and a cathode of the diode is connected to the middle point of the bleeder circuit. It can be learned from one embodiment of the first aspect that a multi-level switching network that outputs four levels can be obtained through simplification of a multi-level switching network that can output five levels. Therefore, less hardware can be used to fulfill a requirement for four levels.

With reference to the first aspect, in one embodiment, there are M multi-level switching networks and M resonant units, where M is an integer greater than 1, and the multi-level switching networks are driven in turn with a timing phase difference of 360°/M; and an output terminal of each of the multi-level switching networks is connected to one end of each of the resonant units in a one-to-one manner, and the other end of each of resonant units is connected to the one end of the primary side of the transformer. It can be learned from one embodiment of the first aspect that the multi-level switching networks and the resonant units may be provided in larger quantities, to meet use requirements of different scenarios.

With reference to the first aspect, in one embodiment, there are M transformers, and the other end of each of the resonant units is connected to one end of a primary side of each of the transformers in a one-to-one manner.

A second aspect of the embodiments of this application provides a power conversion system, including: an input power supply, a bleeder circuit, and N resonant converter apparatuses, where N is an integer greater than 1, each resonant converter apparatus includes a multi-level switching network, a resonant unit, and a transformer, and the multi-level switching network, the resonant unit, and the transformer are respectively the multi-level switching network, the resonant unit, and the transformer in the resonant converter in any one of the first aspect, or any embodiment of the first aspect, where N is an integer greater than 1; a positive electrode and a negative electrode of the input power supply are respectively connected to two ends of the bleeder circuit, and the bleeder circuit is configured to divide a direct current voltage that is input by the input power supply; and the N resonant converter apparatuses are connected in parallel, and one end of each resonant converter apparatus is connected to the bleeder circuit. It can be learned from the second aspect that the structure of the resonant converter in the first aspect can be extended, to fulfill requirements of more complicated scenarios.

With reference to the second aspect, in one embodiment, each resonant converter apparatus includes M multi-level switching networks and M resonant units, where M is an integer greater than 1, and the multi-level switching networks are driven in turn with a timing phase difference of 360°/M; and an output terminal of each of the multi-level switching networks is connected to one end of each of the resonant units in a one-to-one manner, and the other end of each of the resonant units is connected to one end of a primary side of the transformer. In one embodiment of the second aspect, the multi-level switching network and the resonant unit in the resonant converter are extended, so that the power conversion system is applicable to more complicated scenarios.

A third aspect of this application provides a resonant converter control method, where the resonant converter includes: an input power supply, a bleeder circuit, a multi-level switching network, a resonant unit, and a transformer, where a positive electrode and a negative electrode of the input power supply are respectively connected to two ends of the bleeder circuit, and the bleeder circuit is configured to divide a direct current voltage that is input by the input power supply; two input terminals of the multi-level switching network are respectively connected to the two ends of the bleeder circuit, a clamping middle point of the multi-level switching network is connected to a middle point of the bleeder circuit, and a quantity of output levels at an output terminal of the multi-level switching network is greater than 3; one end of the resonant unit is connected to the output terminal of the multi-level switching network, and the other end of the resonant unit is connected to one end of a primary side of the transformer; and the other end of the primary side of the transformer is connected to the middle point of the bleeder circuit; and the control method includes: obtaining, by a control apparatus, a working parameter of the resonant converter, where the control apparatus is located in a power conversion system including the resonant converter; and determining, by the control apparatus, a control instruction based on the working parameter, where the control instruction is used to instruct the multi-level switching network to work in different working modes or in different working manners of one working mode, so that the output terminal of the multi-level switching network outputs square wave voltages with different amplitudes in the different working modes or in the different working manners of one working mode, to serve as input voltages of the resonant unit, where the input voltage is used to adjust a gain of the resonant converter. It can be learned from the third aspect that the control apparatus controls the multi-level switching network according to a requirement of the resonant converter, so as to control an output voltage at the output terminal of the multi-level switching network. This can adjust a final output voltage by adjusting the input voltage of the resonant unit, with no need to significantly adjust a switching frequency of the resonant converter. Therefore, when the output voltage of the resonant converter is relatively low, the resonant converter can still work around a resonance frequency, thereby reducing semiconductor switching losses under low voltage output, and increasing a conversion efficiency and load capacity of the resonant converter under low voltage output.

With reference to the third aspect, in one embodiment, the working parameter includes a required output voltage of the multi-level switching network or a required gain of the resonant converter; and the determining, by the control apparatus, a control instruction based on the working parameter includes: determining, by the control apparatus based on a voltage range in which the required output voltage is located, a working mode to which the multi-level switching network is to switch; or determining, by the control apparatus based on a gain range in which the required gain of the resonant converter is located, a working mode to be switched by the multi-level switching network; and determining, by the control apparatus, the control instruction based on the working mode to which the multi-level switching network is to switch. It can be learned from one embodiment of the third aspect that the control apparatus can control the output voltage of the multi-level switching network through selection of working modes.

With reference to the third aspect, in one embodiment, the control method further includes: controlling, by the control apparatus, the multi-level switching network to work in the different working modes periodically, or controlling the multi-level switching network to work in the different working manners of one working mode within one control period. The control apparatus can switch between different working modes or different working manners of one working mode in one control period. Such a control manner can better improve working efficiency of the resonant converter.

With reference to the third aspect, in one embodiment, when the control method is applied to the power conversion system in the second aspect, the control method further includes: controlling, by the control apparatus, the N resonant converter apparatuses to work in different working modes or in different working manners of one working mode. The control apparatus controls different resonant converter apparatuses to work in the different working modes or in the different working manners of one working mode. This can better improve overall working efficiency of the power conversion system.

A fourth aspect of this application provides a control apparatus, where the control apparatus is applied to a resonant converter control system, the control system includes a resonant converter and the control apparatus, and the resonant converter includes: an input power supply, a bleeder circuit, a multi-level switching network, a resonant unit, and a transformer, where a positive electrode and a negative electrode of the input power supply are respectively connected to two ends of the bleeder circuit, and the bleeder circuit is configured to divide a direct current voltage that is input by the input power supply; two input terminals of the multi-level switching network are respectively connected to the two ends of the bleeder circuit, a clamping middle point of the multi-level switching network is connected to a middle point of the bleeder circuit, and a quantity of output levels at an output terminal of the multi-level switching network is greater than 3; one end of the resonant unit is connected to the output terminal of the multi-level switching network, and the other end of the resonant unit is connected to one end of a primary side of the transformer; and the other end of the primary side of the transformer is connected to the middle point of the bleeder circuit; and the control apparatus includes at least one processor, and the at least one processor is configured to perform the control method in any embodiment of the third aspect.

Another aspect of this application provides a computer readable storage medium, where the computer readable storage medium stores instructions, and when the instructions run on a computer, the computer performs the method in any embodiment of the third aspect.

Another aspect of this application provides a computer program product including instructions, where when the instructions run on a computer, the computer performs the method in any embodiment of the third aspect.

In the resonant converter provided in the embodiments of this application, the multi-level switching network is placed in front of the resonant unit, and the multi-level switching network can adjust the input voltage of the resonant unit. A decrease in the input voltage of the resonant unit inevitably results in a decrease in the output voltage of the entire resonant converter. Such a process is to adjust the final output voltage by adjusting the input voltage of the resonant unit, with no need to significantly adjust a switching frequency of the resonant converter. Therefore, when the output voltage is relatively low, the resonant converter can still work around a resonance frequency, thereby reducing semiconductor switching losses under low voltage output, and increasing a conversion efficiency and load capacity of the resonant converter under low voltage output.

DESCRIPTION OF EMBODIMENTS

The following describes the embodiments of this application with reference to the accompanying drawings. The described embodiments are merely some but not all of the embodiments of this application. A person skilled in the art can understand that with development of technologies and emergence of new scenarios, the technical solutions provided in the embodiments of the present application are also applicable to similar technical issues.

The embodiments of this application provide a resonant converter with which a gain can be adjusted by adjusting an input voltage, with no need to excessively increase a frequency. Therefore, impact of an excessively high working frequency on the resonant converter can be reduced, and efficiency and load capacity of the resonant converter can be improved. The embodiments of this application further provide a corresponding power conversion system, resonant converter control method, and storage medium. Details are separately described in the following.

Figure 1:
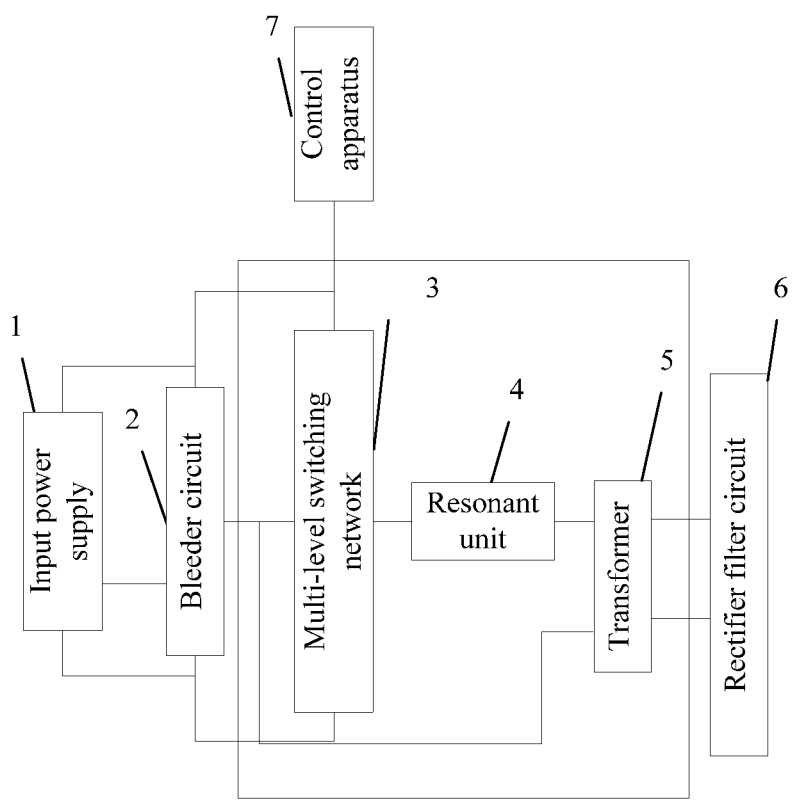
FIG. 1 is a schematic diagram of a framework structure of a resonant converter in an embodiment of this application.

FIG. 1 is a schematic diagram of a framework structure of a resonant converter in an embodiment of this application.

As shown in FIG. 1, the resonant converter provided in this embodiment of this application includes an input power supply 1, a bleeder circuit 2, a multi-level switching network 3, a resonant unit 4, and a transformer 5. The resonant converter may further include a rectifier filter circuit 6.

A positive electrode and a negative electrode of the input power supply 1 are respectively connected to two ends of the bleeder circuit 2, and the bleeder circuit 2 is configured to divide a direct current voltage that is input by the input power supply 1.

Two input terminals of the multi-level switching network 3 are respectively connected to the two ends of the bleeder circuit 2, a clamping middle point of the multi-level switching network 3 is connected to a middle point of the bleeder circuit 2, and a quantity of output levels at an output terminal of the multi-level switching network 3 is greater than 3.

One end of the resonant unit 4 is connected to the output terminal of the multi-level switching network 3, and the other end of the resonant unit 4 is connected to one end of a primary side of the transformer 5.

The other end of the primary side of the transformer 5 is connected to the middle point of the bleeder circuit 2.

A secondary side of the transformer may be connected to an input terminal of the rectifier filter circuit 6.

A winding for a power supply to supply power to a transformer is defined as a primary side, and a winding for output by the transformer to a load is defined as a secondary side.

The multi-level switching network 3 works in different working modes or in different working manners of one working mode according to control instructions of a control apparatus, where the control instruction is given by the control apparatus 7 based on a working parameter of the resonant converter.

The control apparatus 7 may or may not be included in the resonant converter, and the control apparatus 7 may be located in a power conversion system, provided that the control apparatus 7 is able to control the resonant converter. One control apparatus may control work of a plurality of resonant converters.

The output terminal of the multi-level switching network 3 outputs square wave voltages with different amplitudes in the different working modes or in the different working manners of one working mode, to serve as input voltages of the resonant unit 4, where the input voltage is used to adjust a gain of the resonant converter.

Figure 2:
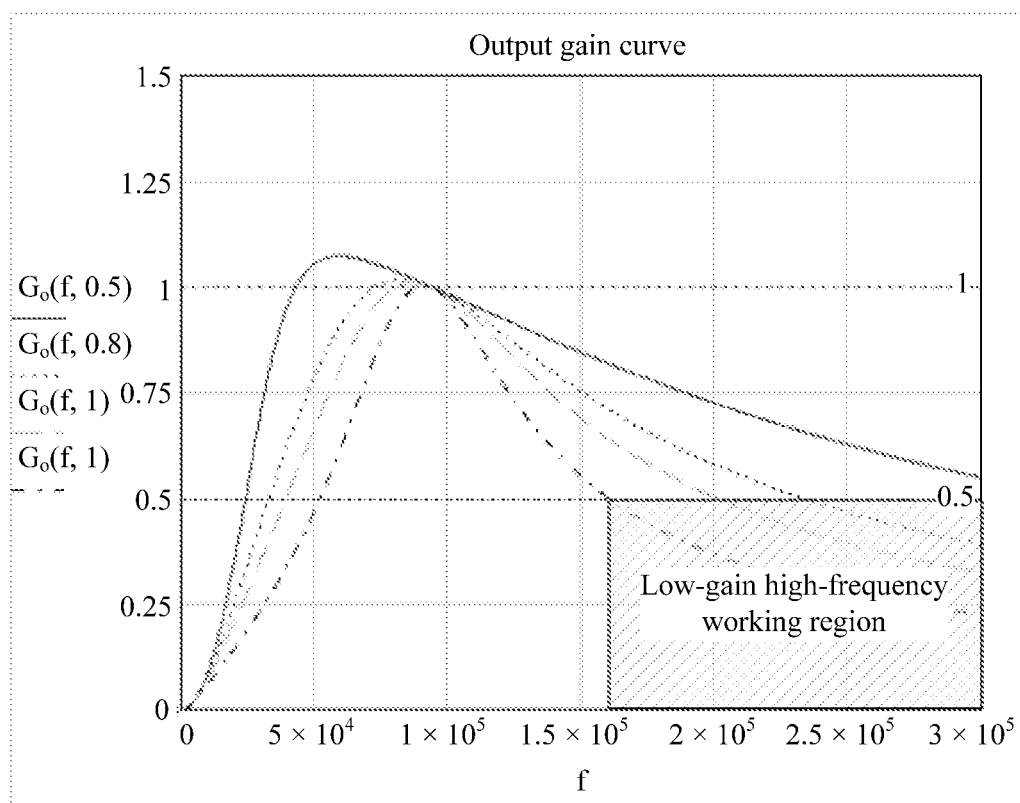
FIG. 2 is a diagram showing working frequency-gain curves of a resonant converter.

FIG. 2 is a diagram showing working frequency-gain curves of a resonant converter.

As shown in FIG. 2, gain-frequency characteristic curves of the resonant converter under four different load statuses are included. It can be learned from characteristics of the curves in FIG. 2 that, when the working frequency is much higher than a resonance frequency, the resonant converter works in a low-gain high-frequency working region. Units affecting a gain of the resonant converter mainly include the multi-level switching network 3, the resonant unit 4, the transformer 5, and the rectifier filter circuit 6. The resonant unit 4, the transformer 5, and the rectifier filter circuit 6 may be collectively referred to as an LLC unit. The gain M_system of the resonant converter may be calculated using the following formula:

$$M\_system = Vout/E = M\_switching\ network \times M\_LLC,$$

where Vout is an output voltage of the LLC unit, E is an input voltage of the multi-level switching network 3, M_switching network represents a gain of the multi-level switching network 3, and M_LLC represents a gain of the LLC unit, where $$M\_LLC = n \times Vout/Vin.$$

Then, based on the foregoing equations, it can be determined that $Vin = E \times M\_switching\ network$.

Here, n is a turn ratio of turns in the transformer 5 in the resonant converter, and Vin is the input voltage of the resonant unit 4.

It can be learned from the foregoing equations that when the required M_system is relatively small, M_LLC may be kept around 1 by adjusting M_switching network. It can be learned from FIG. 2 that the LLC unit ideally works at the resonance frequency, in which case M_LLC is equal to 1. Therefore, when the required output voltage Vout decreases, to ensure that M_LLC stays around 1, Vin in the formula may be reduced by adjusting an output voltage of the switching network 3.

It can be learned from the content described in this embodiment that, with presence of the multi-level switching network 3, the output voltage of the multi-level switching network 3 can be controlled which serves as the input voltage Vin of the resonant unit 4. Therefore, M_LLC can be adjusted by adjusting Vin, to make M_LLC equal to 1 as much as possible. In this case, the resonant unit 4 works at the resonance frequency, and the resonant converter has highest efficiency. This allows the resonant converter to work in a low-gain region efficiently, with no need to excessively increase the working frequency, thereby reducing impact of an excessively high working frequency on the resonant converter, and improving efficiency and load capacity of the resonant converter.

In this embodiment of this application, the quantity of output levels at the output terminal of the multi-level switching network 3 is greater than 3, meaning that the multi-level switching network 3 in this embodiment of this application may be a four-level switching network, a five-level switching network, or a switching network with more output levels. Switching networks with different quantities of output levels have different circuit structures. The following provides description by using a structure of a five-level switching network as an example.

Figure 3:
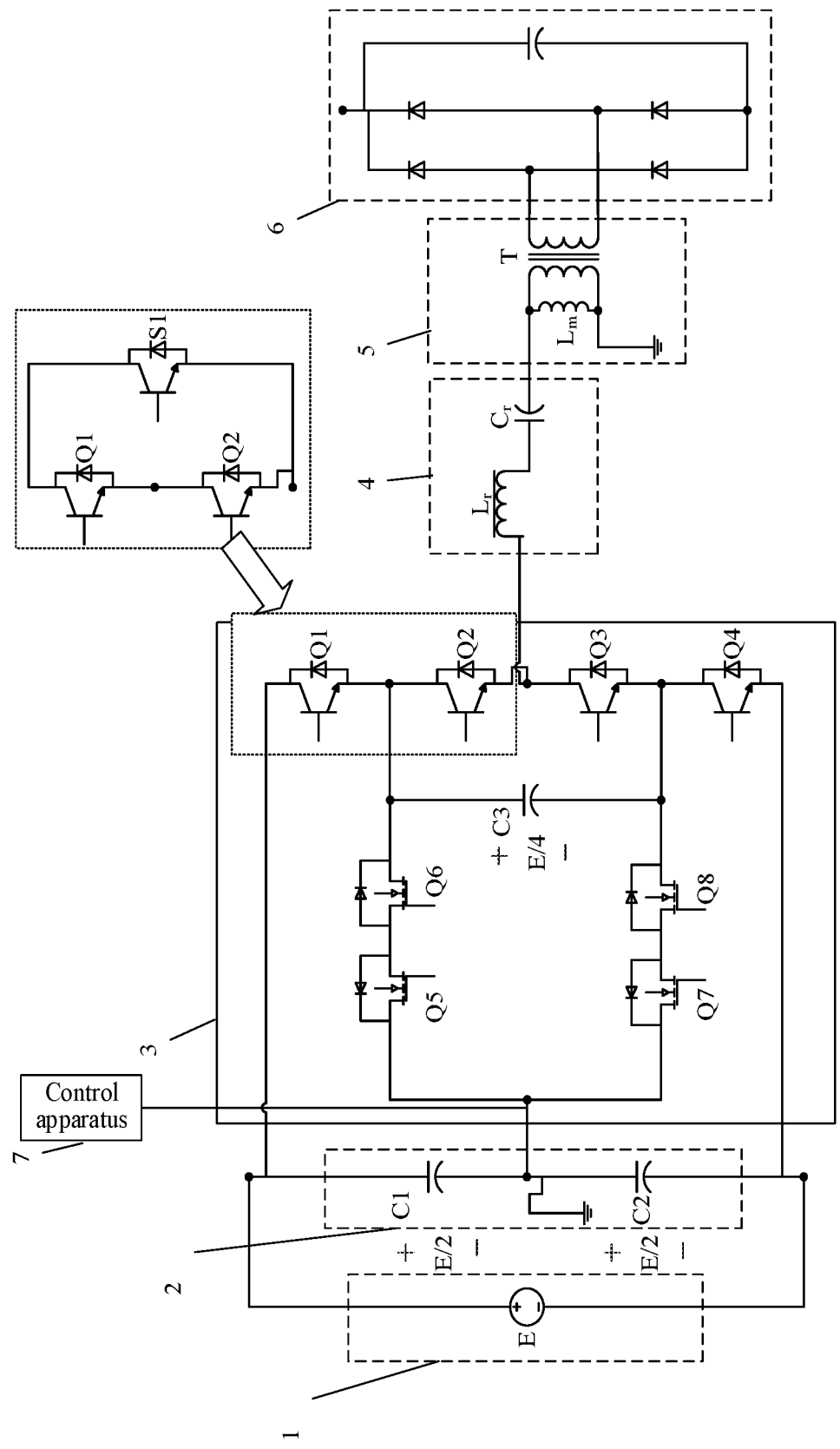
FIG. 3 is a schematic structural diagram of a resonant converter with a five-level switching network in an embodiment of this application.

FIG. 3 is a schematic structural diagram of a resonant converter with a five-level switching network in an embodiment of this application.

As shown in FIG. 3, the bleeder circuit 2 includes a capacitor C1 and a capacitor C2 that are connected in series, and the C1 and the C2 equally share a voltage of the input power supply E. The C1 and the C2 may be identical or different, provided that the voltage of E is equally divided. The C1 and the C2 each undertake a voltage of E/2.

The multi-level switching network 3 includes a switching transistor Q1, a switching transistor Q2, a switching transistor Q3, a switching transistor Q4, and at least one of a first bilateral switch and a second bilateral switch. The switching transistors may be implemented by using one or more of the following types of switching devices: metal oxide semiconductor (MOS) transistors, Insulated Gate Bipolar Transistors (IGBT), gallium nitride (GaN) transistors, Junction Field-Effect Transistors (JFET), and the like.

The Q1, the Q2, the Q3, and the Q4 are sequentially connected in series in a same direction, and the Q1, the Q2, the Q3, and the Q4 in series are connected between the positive electrode and the negative electrode of the input power supply.

The first bilateral switch includes a switching transistor Q5 and a switching transistor Q6 that are connected in reverse series, one end of the first bilateral switch is connected to a connection point between the Q1 and the Q2, and the other end of the first bilateral switch is connected to the middle point of the bleeder circuit 2. The first bilateral switch is configured to implement bidirectional on/off control on a current between the two ends of the first bilateral switch.

The second bilateral switch includes a switching transistor Q7 and a switching transistor Q8 that are connected in reverse series, one end of the second bilateral switch is connected to a connection point between the Q3 and the Q4, and the other end of the second bilateral switch is connected to the middle point of the bleeder circuit 2. The second bilateral switch is configured to implement bidirectional on/off control on a current between the two ends of the second bilateral switch.

A positive electrode of C3 is connected to the connection point between the Q1 and the Q2, and a negative electrode of the C3 is connected to the connection point between the Q3 and the Q4; and a connection point between the Q2 and the Q3 serves as an output terminal of the multi-level switching network to connect to one end of the resonant unit 4, and a voltage between two ends of the C3 is E/4.

In FIG. 3, a switching transistor Si may alternatively be connected in parallel at two ends of the Q1 and the Q2. A withstand voltage of the Si is higher than a withstand voltage of the Q1 and the Q2. Similarly, a switching transistor similar to the Si may also be connected in parallel at two ends of the Q3 and the Q4.

The multi-level switching network 3 in FIG. 3 may output different levels when different switching transistors of the Q1 to the Q8 are on or off. To understand these output levels, refer to Table 1.

TABLE 1

Correspondence between switching transistor
states and output levels

| Switching transistor state (1 for on, 0 for off, and / for either on or off) | | | | | | | | Output level of the multi-level switching network |
|---|---|---|---|---|---|---|---|---|
| Q1 | Q2 | Q3 | Q4 | Q5 | Q6 | Q7 | Q8 | |
| 1 | 1 | 0 | 0 | / | 0 | / | 0 | E/2 |
| 1 | 0 | 1 | 0 | / | 0 | / | 0 | E/4 |
| 0 | 1 | 0 | 0 | / | 0 | 1 | / | |
| 0 | 0 | 1 | 0 | / | 0 | 1 | 1 | 0 |
| 0 | 1 | 0 | 0 | 1 | 1 | 0 | / | |
| 0 | 0 | 1 | 0 | / | 1 | 0 | / | −E/4 |
| 0 | 1 | 0 | 1 | 0 | / | 0 | / | |
| 0 | 0 | 1 | 1 | 0 | / | 0 | / | −E/2 |

According to the first row, states of the switching transistors are: The Q1 and the Q2 are on, the Q3, the Q4, the Q6, and the Q8 are off, and the Q5 and the Q7 may be either on or off. A rationale for that the Q5 may be either on or off is: When a current flows in a forward direction, in one embodiment, a conduction direction of a diode in the Q5, if the Q5 is off, the current flows through the diode in the Q5; and if the Q5 is on, the current flows through the body of Q5. When the current flows in a backward direction, in one embodiment, a cut-off direction of the diode in the Q5, the Q5 needs to be controlled to be always on. A rationale for that the Q7 may be either on or off is the same as that for the Q5. Rationales for that the Q5, the Q6, the Q7, and the Q8 may be either on or off in the second row to the eighth row below are essentially the same as those for the Q5 and the Q7 herein. Details are not described again below. For the switching transistor states in the first row, a voltage at the connection point between the Q2 and the Q3 is the same as the voltage E/2 undertaken by the capacitor C1. Therefore, a voltage at the output terminal of the multi-level switching network 3 is E/2.

Switching transistor states in the second row are: The Q1 and the Q3 are on, the Q2, the Q4, the Q6, and the Q8 are off, and the Q5 and the Q7 may be either on or off. For the switching transistor states in the second row, the Q1 and the Q3 are on, the C1 charges the clamping capacitor C3 through the Q1 and the Q3, a voltage at a bridge arm middle point is equal to the voltage of the C1 minus a voltage of the C3, that is, E/2−E/4=E/4, and a voltage distributed to the connection point between the Q2 and the Q3 is E/4, meaning that the voltage at the output terminal of the multi-level switching network 3 is E/4.

Switching transistor states in the third row are: The Q2 and the Q7 are on, the Q1, the Q3, the Q4, and the Q6 are off, and the Q5 and the Q8 may be either on or off. For the switching transistor states in the third row, because a voltage at a middle point between the C1 and the C2 is 0, regardless of whether the Q8 is on or off, the voltage at the connection point between the Q2 and the Q3 is supplied by the voltage E/4 of the C3. Therefore, the voltage at the output terminal of the multi-level switching network 3 is E/4. In one embodiment, because the Q2, the Q7, or the Q8 is on, and a voltage at the bridge arm middle point is equal to the voltage of the capacitor C3, and therefore an output level is E/4.

Switching transistor states in the fourth row are: The Q3, the Q7, the Q8 are on, the Q1, the Q2, the Q4, and the Q6 are off, and the Q5 may be either on or off. For the switching transistor states in the fourth row, a voltage at the middle point between the C1 and the C2 is 0, and therefore, a voltage at the middle point between the Q2 and Q3 is 0. Therefore, a voltage at the output terminal of the multi-level switching network 3 is 0.

Switching transistor states in the fifth row are: The Q2, the Q5, and the Q6 are on, the Q1, the Q3, the Q4, and Q7 are off, and Q8 may be either on or off. For the switching transistor states in the fifth row, a voltage at the middle point between the C1 and the C2 is 0, and therefore, a voltage at the middle point between the Q2 and Q3 is 0. Therefore, a voltage at the output terminal of the multi-level switching network 3 is 0.

Switching transistor states in the sixth row are: The Q3 and the Q6 are on, the Q1, the Q2, the Q4, and the Q7 are off, and the Q5 and the Q8 may be either on or off. For the switching transistor states in the sixth row, regardless of whether the Q5 is on or off, a voltage at the connection point between the Q2 and the Q3 is supplied by the C3. Because the Q3 is connected to the negative electrode of the C3, a voltage at the connection point between the Q2 and the Q3 is −E/4. Therefore, a voltage at the output terminal of the multi-level switching network 3 is −E/4.

Switching transistor states in the seventh row are: The Q2 and the Q4 are on, the Q3, the Q5, and the Q7 are off, and the Q6 and the Q8 may be either on or off. For the switching transistor states in the seventh row, after a voltage −E/2 of the capacitor C2 switches to −E/4 through voltage step-up of the C3, a resulting voltage at the connection point between the Q2 and the Q3 is −E/4. Therefore, a voltage at the output terminal of the multi-level switching network 3 is −E/4.

Switching transistor states in the eighth row are: The Q3 and the Q4 are on, the Q1, the Q2, the Q5, and the Q7 are off, and the Q6 and the Q8 may be either on or off. For the switching transistor states in the eighth row, a voltage at the middle point between Q2 and Q3 is the same as the voltage of the C2, that is, −E/2. Therefore, a voltage at the output terminal of the multi-level switching network 3 is −E/2.

It can be learned from Table 1 that the five-level switching network may generate five amplitudes of level at the output terminal. Any two levels are combined to generate 10 square wave voltages with different amplitudes at the output terminal of the multi-level switching network. Combination manners to obtain the 10 square wave voltages with different amplitudes may include (E/2, −E/2), (E/2, −E/4), (E/4, −E/2), (E/2, 0), (E/4, −E/4), (0, −E/2), (E/2, E/4), (E/4, 0), (0, −E/4), and (−E/4, −E/2).

Level differences of the 10 different combinations are E, 3E/4, 3E/4, E/2, E/2, E/2, E/4, E/4, E/4, and E/4, respectively. By level difference, combinations of a same level difference are grouped into one working mode. In this way, there may be four working modes. For working modes in which level differences are 3E/4, E/2, and E/4, each working mode further includes a plurality of working manners. This relationship may be expressed by using Table 2 below.

TABLE 2

Correspondence between working modes and square
wave voltages with different amplitudes

| | Square wave voltage at the output terminal of the multi-level switching network | | | |
|---|---|---|---|---|
| Working modes | Working manner A | Working manner B | Working manner C | Working manner D |
| Working mode 1 | (E/2, −E/2) | | | |
| Working mode 2 | (E/2, −E/4) | (E/4, −E/2) | | |

TABLE 2-continued

Correspondence between working modes and square wave voltages with different amplitudes

| Working modes | Square wave voltage at the output terminal of the multi-level switching network | | | |
|---|---|---|---|---|
| | Working manner A | Working manner B | Working manner C | Working manner D |
| Working mode 3 | (E/2, 0) | (E/4, −E/4) | (0, −E/2) | |
| Working mode 4 | (E/2, E/4) | (E/4, 0) | (0, −E/4) | (−E/4, −E/2) |

It can be learned from Table 2 that a level difference in the working mode 1 is E, a level difference in the working mode 2 is 3E/4, a level difference in the working mode 3 is E/2, and a level difference in the working mode 4 is E/4.

Figure 4:
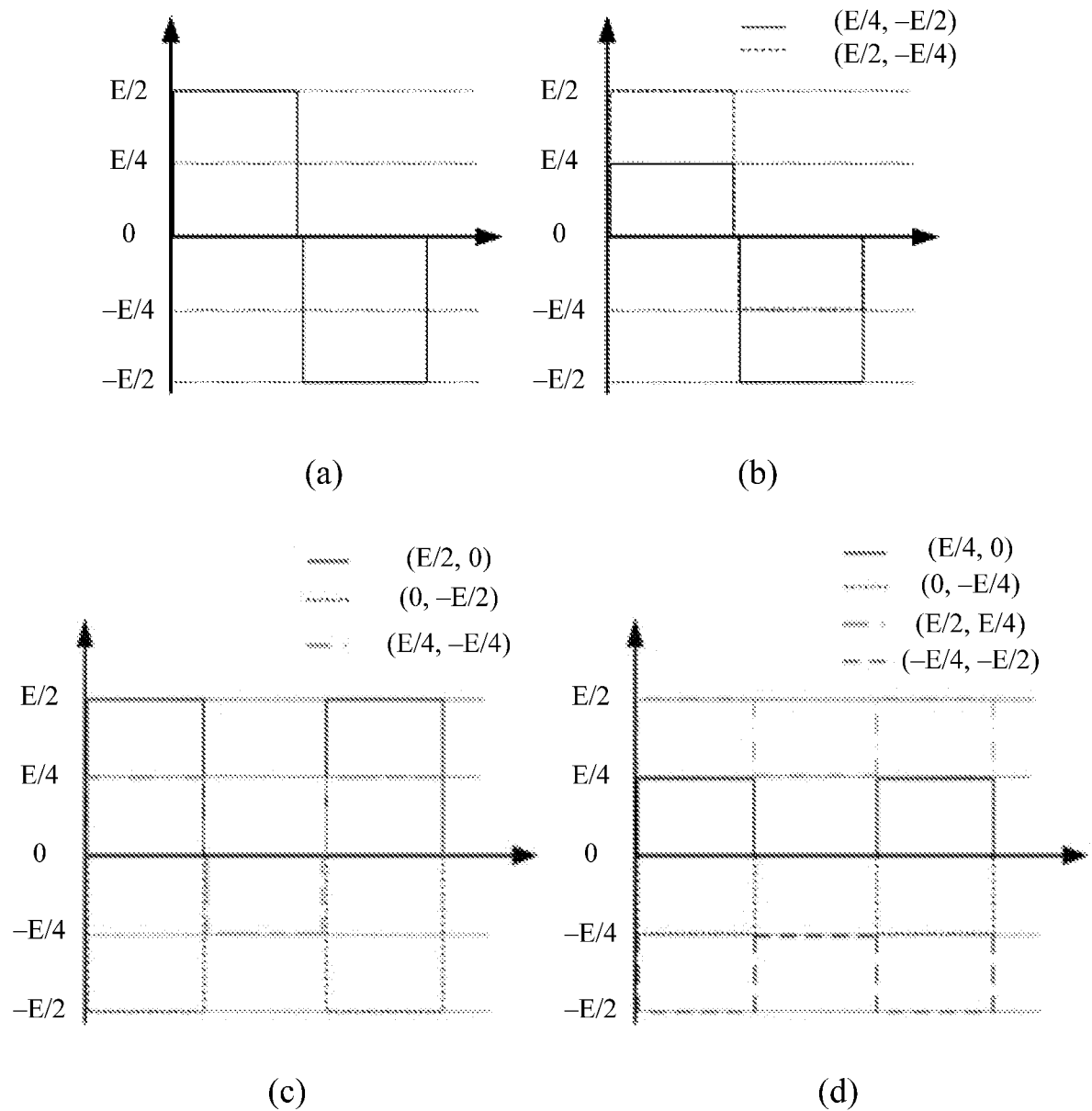
FIG. 4 shows waveform graphs of square wave voltages corresponding to four working modes of a five-level switching network.

To understand waveform graphs of square wave voltages corresponding to the four working modes in Table 2, refer to (a) to (d) of FIG. 4. (a) corresponds to the working mode 1, and a square wave level difference is E; (b) corresponds to the working mode 2, and a square wave level difference is 3E/4; (c) corresponds to the working mode 3, and a square wave level difference is E/2; and (d) corresponds to the working mode 4, and a square wave level difference is E/4.

The different working modes or the different working manners of one working mode are respectively corresponding to the different switching transistor states in Table 1. Therefore, when an output voltage at the output terminal of the multi-level switching network needs to be adjusted, the control apparatus may first obtain a working parameter of the resonant converter, where the working parameter may include, for example, a required output voltage at the output terminal of the multi-level switching network or a required gain of the resonant converter; then based on the working parameter, determine to select which working mode or which working manner of which working mode; and accordingly generate a control instruction and pass the control instruction to the multi-level switching network, to control the switching transistors to be on or off, thereby generating a square wave voltage with corresponding amplitudes at the output terminal, so that an input voltage of the resonant unit and an output voltage of the resonant unit are matched to secure the required gain.

The control apparatus determines, based on a voltage range in which the required output voltage is located, a working mode to which the multi-level switching network is to switch, or the control apparatus determines, based on a gain range in which the required gain of the resonant converter is located, a working mode to which the multi-level switching network is to switch; and the control apparatus determines the control instruction based on the working mode to which the multi-level switching network is to switch.

Selection control schemes corresponding to the foregoing four working modes may be as follows:

In the working mode 1, the required output voltage at the output terminal of the multi-level switching network>a threshold voltage 1 (or the gain M_system of the resonant converter>0.75/n, where n is a turn ratio of the transformer). The required output voltage is used as an example for description. A principle of the gain M_system is the same as the principle of the required output voltage.

When the required output voltage is greater than the threshold voltage 1, the control apparatus controls, by using the control instruction, the switching transistors to be in the corresponding switching states in Table 1, so that the multi-level switching network works in the working mode 1. The multi-level switching network outputs a square wave level as shown in (a) to serve as the input voltage of the resonant unit.

In the working mode 2, the threshold voltage 1>the required output voltage at the output terminal of the multi-level switching network>a threshold voltage 2 (or 0.75/n≥the gain M_system>0.5/n).

When the required output voltage is between the threshold voltage 1 and the threshold voltage 2, the control apparatus may make, by using the control instruction, the switching transistors in the multi-level switching network work in the corresponding states in Table 1, so that the multi-level switching network works in the working mode 2. The multi-level switching network outputs a square wave level as shown in (b) to serve as the input voltage of the resonant unit. There are two working manners in the working mode 2, and the two working manners are respectively corresponding to square wave voltages with different amplitudes. The control apparatus may control switching between the two working manners of the working mode 2.

In the working mode 3, the threshold voltage 2>the required output voltage at the output terminal of the multi-level switching network>a threshold voltage 3 (or 0.5/n≥the gain M_system>0.25/n).

When the required output voltage is between the threshold voltage 2 and the threshold voltage 3, the control apparatus may make, by using the control instruction, the switching transistors in the multi-level switching network work in the corresponding states in Table 1, so that the multi-level switching network works in the working mode 3. The multi-level switching network outputs a square wave level as shown in (c) to serve as the input voltage of the resonant unit. There are three working manners in the working mode 3, and the three working manners are respectively corresponding to square wave voltages with different amplitudes. The control apparatus may control switching between the three working manners of the working mode 3.

In this embodiment of this application, the control apparatus may control the multi-level switching network to work in different working modes periodically, or may control the multi-level switching network to work in different working manners of one working mode within one control period.

In the working mode 4, the threshold voltage 3>the required output voltage at the output terminal of the multi-level switching network (or 0.25/n≥the gain M_system).

When the required output voltage is less than the threshold voltage 3, the control apparatus may make, by using the control instruction, the switching transistors in the multi-level switching network work in the corresponding states in Table 1, so that the multi-level switching network works in the working mode 4. The multi-level switching network outputs a square wave level as shown in (d) to serve as the input voltage of the resonant unit. There are four working manners in the working mode 4, and the four working manners are respectively corresponding to square wave voltages with different amplitudes. The control apparatus may control switching between the four working manners of the working mode 4.

It can be learned from the foregoing analysis that there are a plurality of switching states in each of the working modes 2, 3, and 4. Although square waves generated at the output terminal of the multi-level switching network in switching states of one working mode are different, these square waves have a same level difference and correspond to a same output gain. Therefore, switching between the different working manners is possible.

The five-level switching network is used as an example for description in FIG. 3. Actually, the multi-level switching network in this embodiment of the present application may alternatively be a four-level switching network or a three-level switching network, or may be other multi-level switching networks with more than five levels.

The following simplifies the five-level switching network shown in FIG. 3, and describes several four-level switching networks and three-level switching networks.

Figure 5:
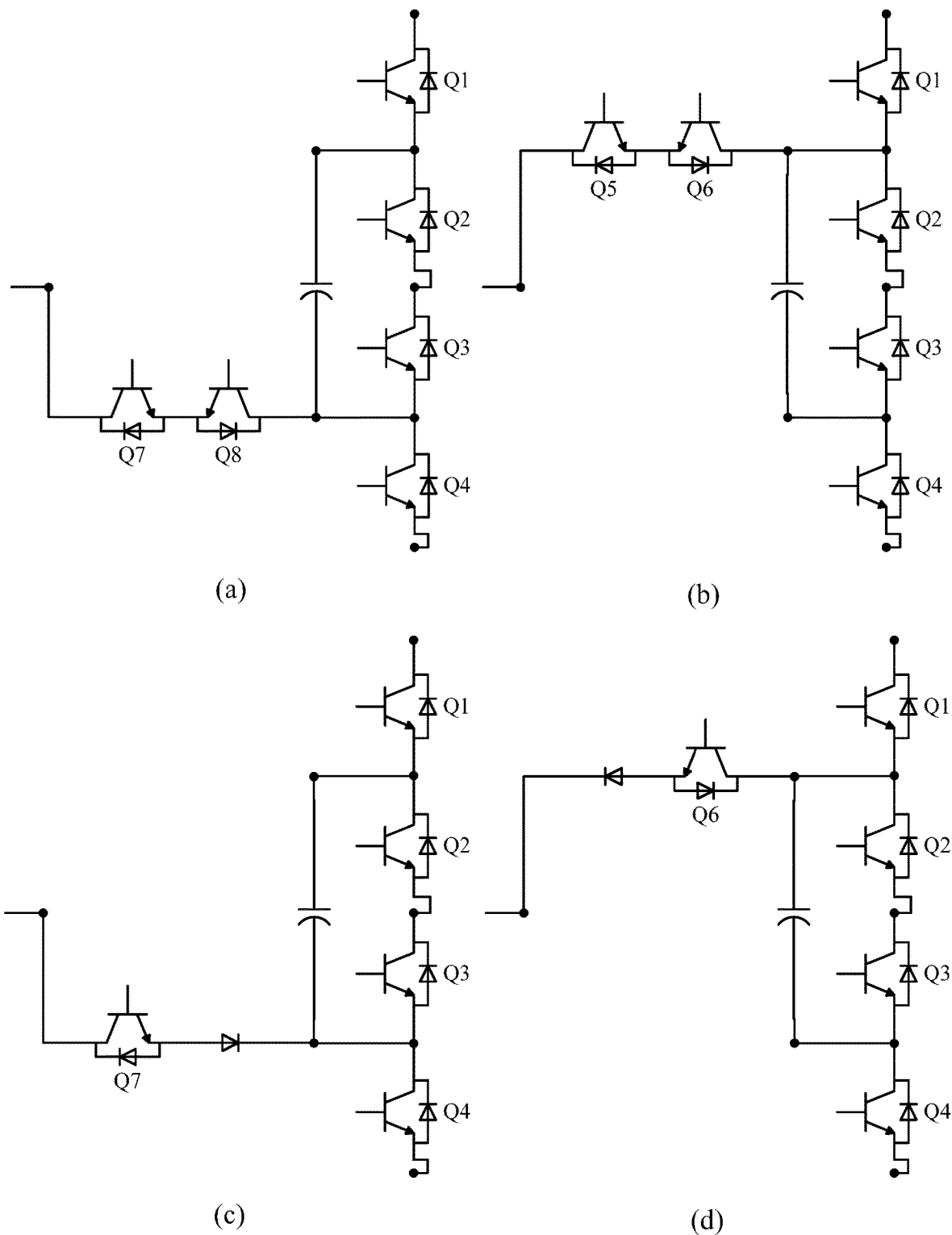
FIG. 5 is a schematic diagram showing several circuit structures of three-level and four-level switching networks.

As shown in (a) of FIG. 5, the first bilateral switch including the Q5 and the Q6 is removed from the multi-level switching network in FIG. 3. By using the structure shown in (a) of FIG. 5, four levels excluding −E/4 may be output. In other words, an output terminal of this four-level switching network may output four output levels including E/2, E/4, 0, and −E/2.

As shown in (b) of FIG. 5, the second bilateral switch including the Q7 and the Q8 is removed from the multi-level switching network in FIG. 3. By using the structure shown in (b) in FIG. 5, four levels excluding E/4 may be output. In other words, an output terminal of this four-level switching network may output four output levels including E/2, 0, −E/4, and −E/2.

As shown in (c) of FIG. 5, the first bilateral switch including the Q5 and the Q6 is removed from the multi-level switching network in FIG. 3; and the Q8 is a diode, where an anode of the diode is connected to an emitter of the Q7, and a cathode of the diode is connected to the negative electrode of the C3. Both switching transistors and diodes belong to semiconductor transistors. By using the structure shown in (c) of FIG. 5, three levels excluding −E/4 and 0 may be output. In other words, an output terminal of this three-level switching network may output three output levels including E/2, E/4, and −E/2.

As shown in (d) of FIG. 5, the second bilateral switch including the Q7 and the Q8 is removed from the multi-level switching network in FIG. 3; and the Q5 is a diode, where an anode of the diode is connected to an emitter of the Q6, and a cathode of the diode is connected to the middle point of the bleeder circuit. Both switching transistors and diodes belong to semiconductor transistors. By using the structure shown in (d) of FIG. 5, three levels excluding E/4 and 0 may be output. In other words, an output terminal of this three-level switching network may output three output levels including E/2, −E/4, and −E/2.

As shown in (e) of FIG. 5, the multi-level switching network may output four levels. This four-level switching network may include: a switching transistor Q1, a switching transistor Q2, a switching transistor Q3, a switching transistor Q4, a bilateral switch, and a capacitor C3. The Q1, the Q2, and the Q3 are sequentially connected in series in a same direction; the Q1, the Q2, and the Q3 in series are connected between the positive electrode and the negative electrode of the input power supply; one end of the bilateral switch is connected to a connection point between the Q2 and the Q3, and the other end of the bilateral switch is connected to a negative electrode of the C3; and a positive electrode of the C3 is connected to a connection point between the Q1 and the Q2, a collector of the Q4 is connected to the negative electrode of the C3, and an emitter of the Q4 is connected to the middle point of the bleeder circuit. By using a structure shown in (e) in FIG. 5, four levels excluding −E/4 may be output. In other words, an output terminal of the four-level switching network may output four output levels including E/2, E/4, 0, and −E/2.

As shown in (f) of FIG. 5, the multi-level switching network may output four levels. This four-level switching network may include: a switching transistor Q1, a switching transistor Q2, a switching transistor Q3, a switching transistor Q4, a bilateral switch, and a capacitor C3. The Q1, the Q2, and the Q3 are sequentially connected in series in a same direction; the Q1, the Q2, and the Q3 in series are connected between the positive electrode and the negative electrode of the input power supply; one end of the bilateral switch is connected to a connection point between the Q1 and the Q2, and the other end of the bilateral switch is connected to a positive electrode of the C3; and a negative electrode of the C3 is connected to the connection point between the Q3 and the Q2, an emitter of the Q4 is connected to the positive electrode of the C3, and a collector of the Q4 is connected to the middle point of the bleeder circuit. By using the structure shown in (0 of FIG. 5, four levels excluding E/4 may be output. In other words, an output terminal of the four-level switching network may output four output levels including E/2, 0, −E/4, and −E/2.

As shown in (g) of FIG. 5, the multi-level switching network may output three levels. This three-level switching network may include: a switching transistor Q1, a switching transistor Q2, a switching transistor Q3, a diode D1, a bilateral switch, and a capacitor C3. The Q1, the Q2, and the Q3 are sequentially connected in series in a same direction; the Q1, the Q2, and the Q3 in series are connected between the positive electrode and the negative electrode of the input power supply; one end of the bilateral switch is connected to a connection point between the Q2 and the Q3, and the other end of the bilateral switch is connected to a negative electrode of the C3; and a positive electrode of the C3 is connected to a connection point between the Q1 and the Q2, an anode of the D1 is connected to the middle point of the bleeder circuit, and a cathode of the D1 is connected to the negative electrode of the C3. By using the structure shown in (g) of FIG. 5, three levels excluding −E/4 and 0 may be output. In other words, an output terminal of the three-level switching network may output three output levels including E/2, E/4, and −E/2.

As shown in (h) of FIG. 5, the multi-level switching network may output three levels. This three-level switching network may include: a switching transistor Q1, a switching transistor Q2, a switching transistor Q3, a diode D1, a bilateral switch, and a capacitor C3. The Q1, the Q2, and the Q3 are sequentially connected in series in a same direction; the Q1, the Q2, and the Q3 in series are connected between the positive electrode and the negative electrode of the input power supply; one end of the bilateral switch is connected to a connection point between the Q1 and the Q2, and the other end of the bilateral switch is connected to a positive electrode of the C3; and a negative electrode of the C3 is connected to a connection point between the Q3 and the Q2, an anode of the D1 is connected to the positive electrode of the C3, and a cathode of the D1 is connected to the middle point of the bleeder circuit. By using the structure shown in (h) of FIG. 5, three levels excluding E/4 and 0 may be output. In other words, an output terminal of the three-level switching network may output three output levels including E/2, −E/4, and −E/2.

A working principle of the circuit structure for three-level or four-level output in (a) to (h) in FIG. 5 is similar to the working principle shown in FIG. 3, with a difference only in smaller quantities of switching transistors, working modes, and working manners. Therefore, specific resonance control principles of the circuit structures in (a) to (h) of FIG. 5 are not further described.

The foregoing describes only a five-level switching network and four-level or three-level switching networks resulting from programming the five-level switching network with reference to FIG. 3 to FIG. 5. The following describes another five-level switching network with reference to FIG. 6.

Figure 6:
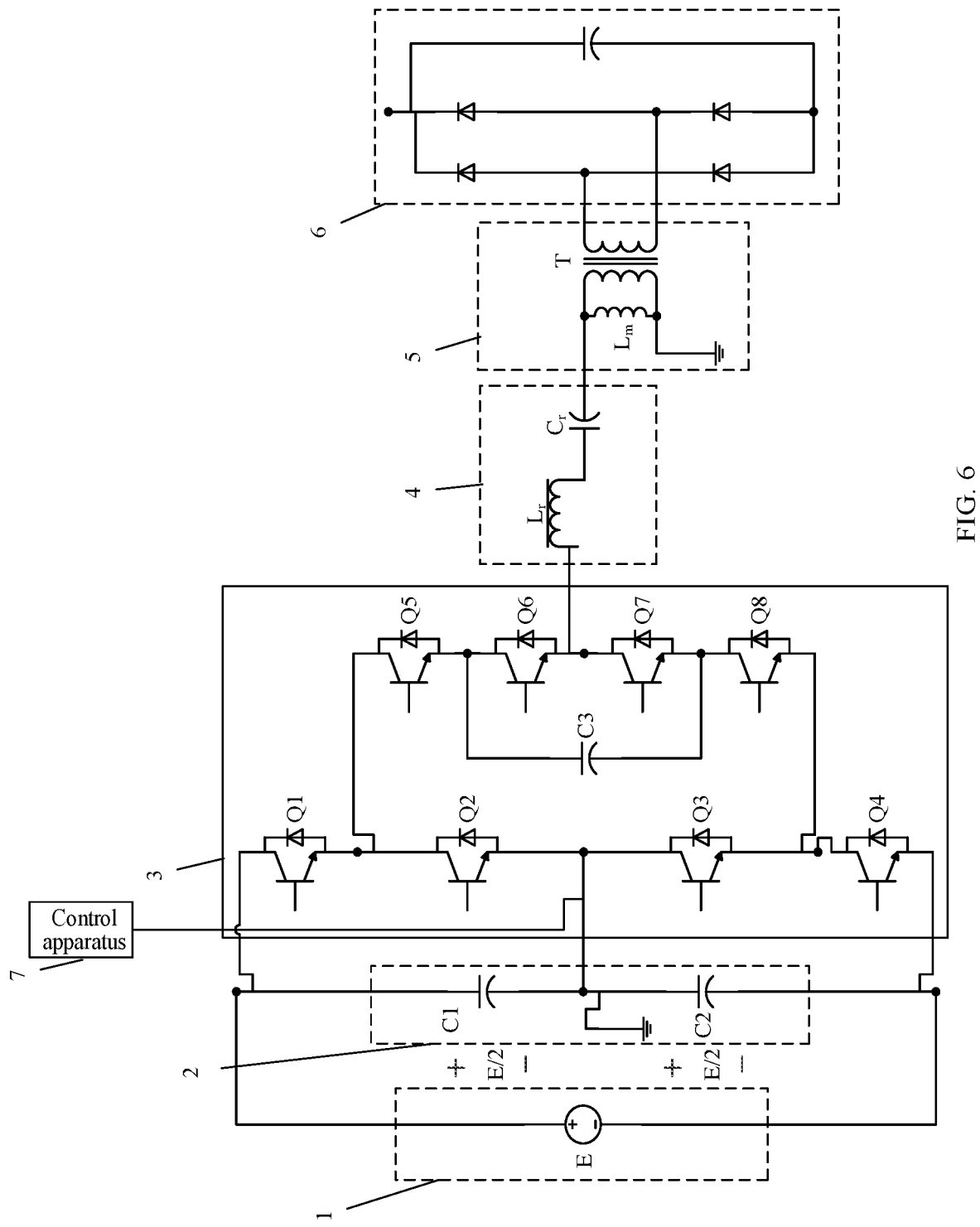
FIG. 6 is another schematic structural diagram of a resonant converter with a five-level switching network in an embodiment of this application.

As shown in FIG. 6, the bleeder circuit includes a capacitor C1 and a capacitor C2 that are connected in series, where the C1 and the C2 are identical and equally share the voltage of the input power supply E; and when the quantity of output levels of the multi-level switching network is 5, the multi-level switching network includes a first bridge arm, a second bridge arm, and a capacitor C3.

The first bridge arm includes a switching transistor Q1, a switching transistor Q2, a switching transistor Q3, and a switching transistor Q4, and the second bridge arm includes a switching transistor Q5, a switching transistor Q6, a switching transistor Q7, and a switching transistor Q8.

The Q1, the Q2, the Q3, and the Q4 are sequentially connected in series in a same direction, the Q1, the Q2, the Q3, and the Q4 in series are connected between the positive electrode and the negative electrode of the input power supply, a connection point between the Q1 and the Q2 is a first connection point, a connection point between the Q2 and the Q3 is a second connection point, a connection point between the Q3 and the Q4 is a third connection point, and the second connection point is connected to the middle point of the bleeder circuit.

The Q5, the Q6, the Q7, and the Q8 are sequentially connected in series in a same direction, and the Q5, the Q6, the Q7, and the Q8 in series are connected between the first connection point and the third connection point.

A middle point between the Q7 and the Q8 serves as the output terminal of the multi-level switching network to connect to the one end of the resonant unit, a positive electrode of the C3 is connected to a connection point between the Q5 and the Q6, a negative electrode of the C3 is connected to a connection point between the Q7 and the Q8, and a voltage between the two ends of the C3 is E/4.

The five-level switching networks in FIG. 6 and FIG. 3 have different circuit structures but a same implementation principle. For example, the circuit structure of the multi-level switching network in FIG. 6 may have eight states listed in Table 3 below.

At bridge arm middle points, the five-level switching network may obtain five level signals: E/2, E/4, 0, −E/4, and −E/2. Drive control logic of the five-level switching network is described in the following table:

TABLE 3

Correspondence between switching transistor states and output levels

| Switching transistor state (1 for on, 0 for off, and / for either on or off) | | | | | | | | Output level of the multi-level switching |
|---|---|---|---|---|---|---|---|---|
| Q1 | Q2 | Q3 | Q4 | Q5 | Q6 | Q7 | Q8 | network |
| 1 | / | 1 | 0 | 1 | 1 | 0 | 0 | E/2 |
| 1 | 0 | 1 | 0 | 1 | 0 | 1 | 0 | E/4 |
| 1 | 0 | 1 | 0 | 1 | 0 | 0 | 1 | |
| 1 | 0 | 1 | 0 | 0 | 0 | 1 | 1 | 0 |
| 0 | 1 | 0 | 1 | 1 | 1 | 0 | 0 | |
| 0 | 1 | 0 | 1 | 1 | 0 | 1 | 0 | −E/4 |
| 0 | 1 | 0 | 1 | 0 | 1 | 0 | 1 | |
| 0 | 1 | 0 | 1 | 0 | 0 | 1 | 1 | −E/2 |

For circuit analysis of different on or off states of the switching transistors in Table 3 and how the output levels are obtained, refer to the process of Table 1 with reference to FIG. 3; and to understand a circuit principle and a work control principle, also refer to corresponding descriptions of the embodiment corresponding to FIG. 3. Details are not described herein again.

In the foregoing embodiments, the resonant converter includes only one multi-level switching network and only one resonant unit. Actually, there may be M multi-level switching networks and M resonant units, where M is an integer greater than 1, and the multi-level switching networks are driven in turn with a timing phase difference of 360°/M. An output terminal of each of the multi-level switching networks is connected to one end of each of the resonant units in a one-to-one manner, and the other end of each of the resonant units is connected to the one end of the primary side of the transformer. There are M transformers, and the other end of each of the resonant units is connected to one end of a primary side of each of the transformers in a one-to-one manner.

Figure 7:
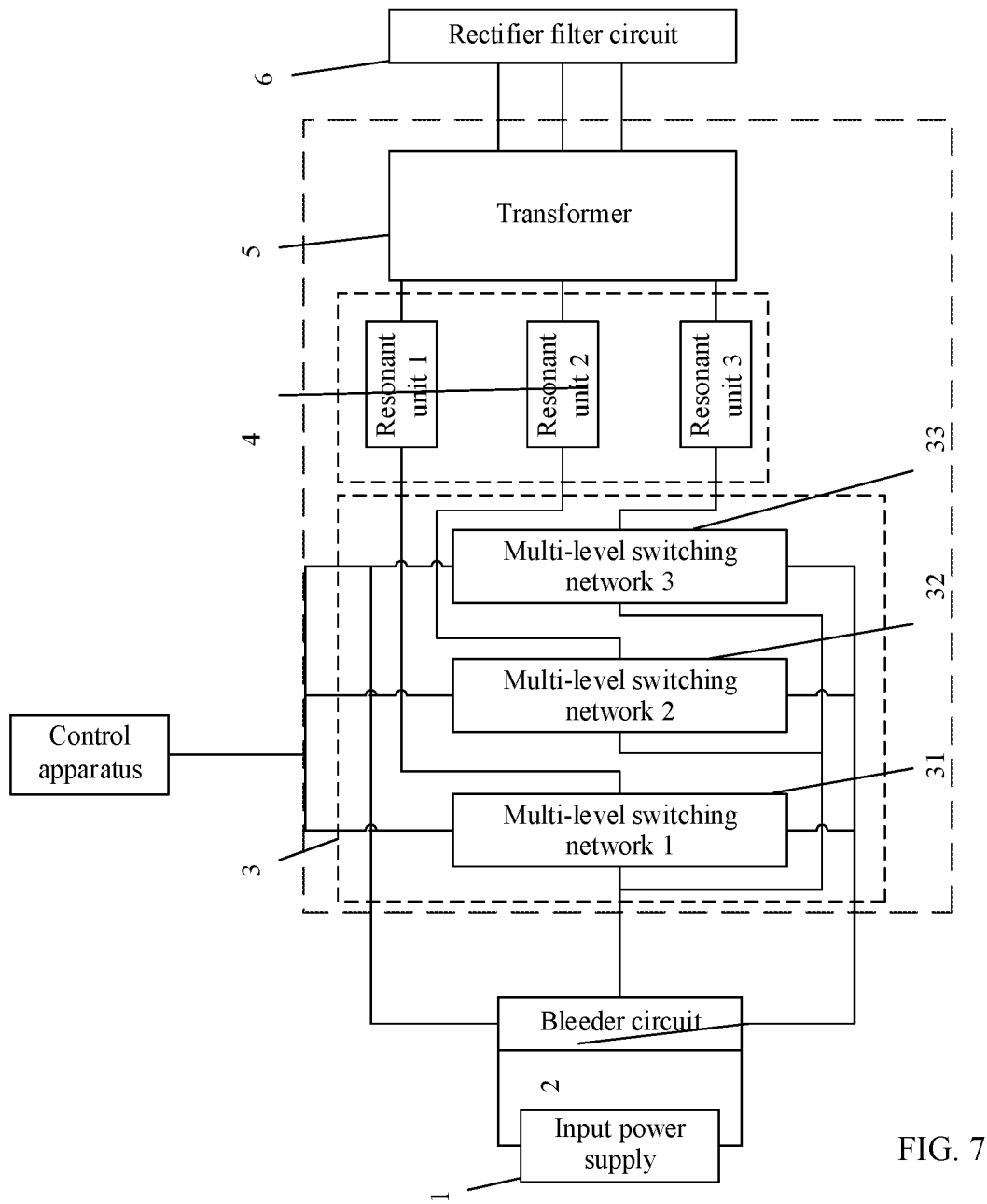
FIG. 7 is another schematic structural diagram of a resonant converter with a plurality of multi-level switching networks in an embodiment of this application.

As shown in FIG. 7, a resonant converter includes an input power supply, a bleeder circuit, a multi-level switching network 1, a multi-level switching network 2, and a multi-level switching network 3, a resonant unit 1, a resonant unit 2, and a resonant unit 3, a transformer, and a rectifier filter circuit. An output terminal of the multi-level switching network 1 is connected to the resonant unit 1, an output terminal of the multi-level switching network 2 is connected to the resonant unit 2, and an output terminal of the multi-level switching network 3 is connected to the resonant unit 3. To understand connection relationships between other units, refer to the connection relationships in FIG. 1. Details are not described herein again. The multi-level switching network 1, the multi-level switching network 2, and the multi-level switching network 3 may have identical or different circuit structures.

The transformer 5 may be a six-terminal network, and a secondary side of the transformer 5 is connected to an input terminal of the rectifier filter circuit 6.

Alternatively, there may be three transformers. A primary side of each of the transformers is connected to one end of each of three resonant units in a one-to-one manner. A secondary side of each of the transformers is connected to a middle point of each of three secondary side bridge arms in a one-to-one manner. The transformers may be connected in a □-□ style, a □-Y style, a Y-□ style, a Y-Y style, or other styles. When the transformers are connected in a Y style, a middle point of Y may be suspended or connected to a specific network.

For circuit analysis of different on or off states of the switching transistors in FIG. 7 and how the output levels are obtained, refer to the process of Table 1 with reference to FIG. 3; and to understand a circuit principle and a work control principle, also refer to corresponding descriptions of the embodiment corresponding to FIG. 3. Details are not described herein again.

An embodiment of this application further provides a power conversion system, including: an input power supply, a bleeder circuit, and N resonant converter apparatuses. The power conversion system may further include N rectifier filter circuits, where N is an integer greater than 1. Each resonant converter apparatus includes a multi-level switching network, a resonant unit, and a transformer. The multi-level switching network, the resonant unit, and the transformer are respectively the multi-level switching network, the resonant unit, and the transformer in the resonant converter in the foregoing embodiments described in FIG. 1 to FIG. 7, where N is an integer greater than 1. Two ends of the input power supply are respectively connected to two ends of the bleeder circuit, and the bleeder circuit is configured to divide a direct current voltage that is input by the input power supply. The N resonant converter apparatuses are connected in parallel, with one end of each resonant converter apparatus connected to the bleeder circuit, and the other end of each resonant converter apparatus connected to a rectifier filter circuit corresponding to the resonant converter apparatus.

Figure 8:
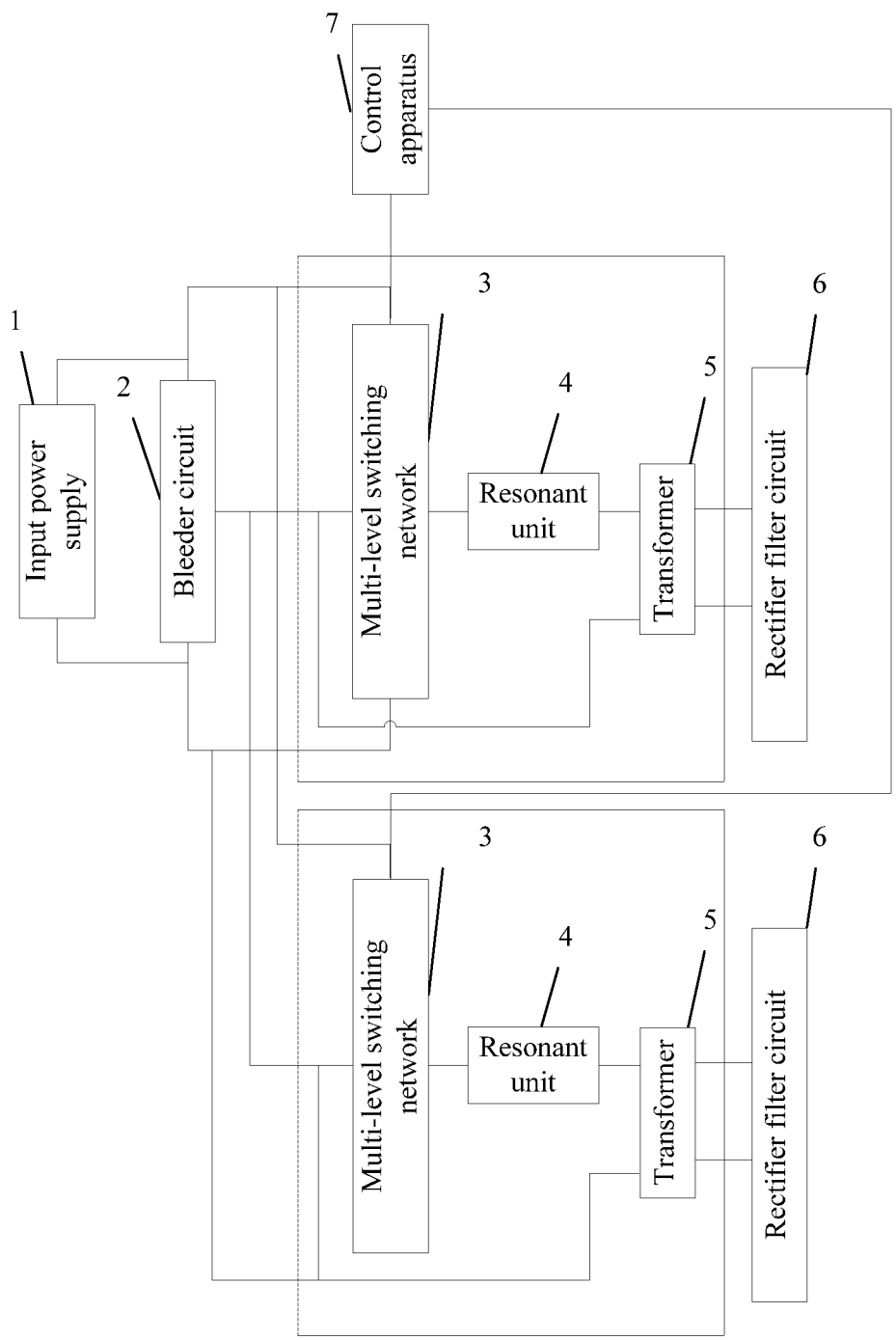
FIG. 8 is a schematic structural diagram of a power conversion system in an embodiment of this application.

In the power conversion system shown in FIG. 8, N=2, and the two resonant converter apparatuses are connected in parallel. The input power supply and the bleeder circuit may supply voltages to the two resonant converter apparatuses. A control apparatus may control multi-level switching networks in the two resonant converter apparatuses to work in different working modes or in different working manners of one working mode.

Each resonant converter apparatus in the power conversion system includes M multi-level switching networks and M resonant units, where M is an integer greater than 1, and the multi-level switching networks are driven in turn with a timing phase difference of 360°/M. An output terminal of each of the multi-level switching networks is connected to one end of each of the resonant units in a one-to-one manner, and the other end of each of the resonant units is connected to one end of a primary side of the transformer.

Figure 9:
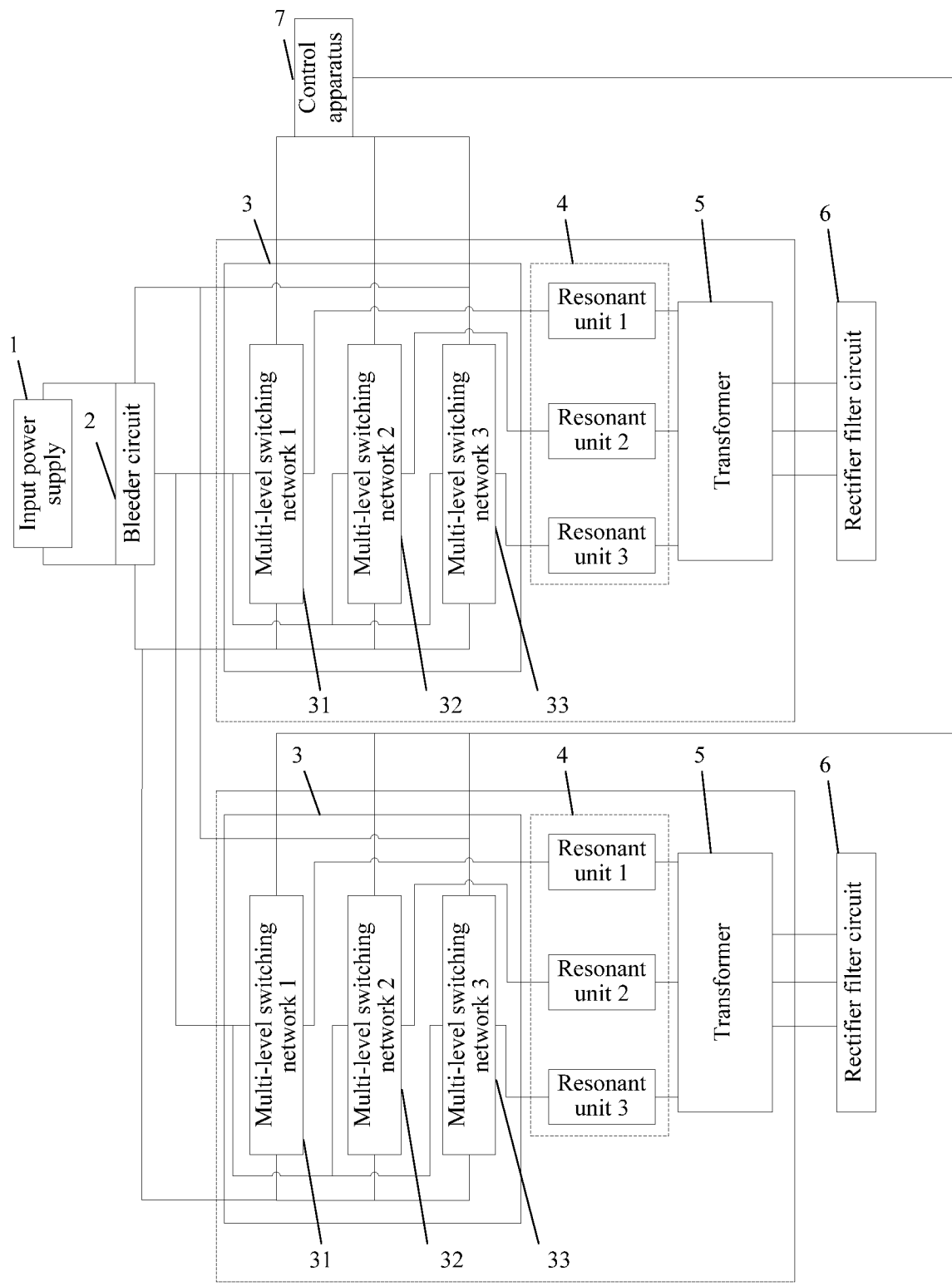
FIG. 9 is a schematic structural diagram of a power conversion system in an embodiment of this application.

In other words, the structure in FIG. 7 may be applied to FIG. 8, to obtain a power conversion system shown in FIG. 9. The control apparatus may control the N resonant converter apparatuses to work in different working modes or in different working manners of one working mode.

An embodiment of this application further provides a control method of a resonant converter. The control method of a resonant converter is applied to the resonant converter described in FIG. 1 to FIG. 9. The control method of a resonant converter may be implemented by using hardware or software. Regardless of whether the control method of a resonant converter is implemented by using hardware or software, for understanding, refer to the corresponding functions of the control apparatus in FIG. 1 to FIG. 9.

Figure 10:
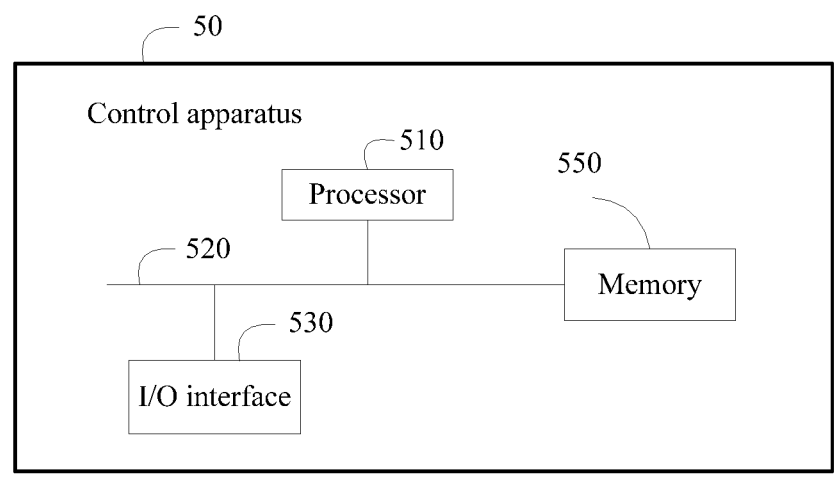
FIG. 10 is a schematic structural diagram of a control apparatus in an embodiment of this application.

When the control method of a resonant converter is implemented by using software, to understand the control apparatus in the embodiments of this application, refer to FIG. 10.

FIG. 10 is a schematic structural diagram of a control apparatus 50 according to an embodiment of this application. The control apparatus 50 may be a chip or a chip system. The chip or the chip system may include at least one processor 510. The processor 510 may be a Digital Signal Processor (DSP), and the processor 510 may include a memory. Alternatively, the chip or the chip system may include a memory 550. The chip or the chip system may further include an input/output (I/O) interface 530. The memory 550 may include a read-only memory and a random access memory, and provide an operation instruction and data to the processor 510. A part of the memory 550 may further include a non-volatile random access memory (NVRAM).

In some embodiments, the memory 550 stores the following elements: executable modules or data structures, or a subset thereof, or an extended set thereof.

In this embodiment of the present application, in a digest obtaining process, an operation instruction stored in the memory 550 (where the operation instruction may be stored in an operating system) is invoked to:

obtain a working parameter of a resonant converter; and determine a control instruction based on the working parameter, where the control instruction is used to instruct a multi-level switching network to work in different working modes or in different working manners of one working mode, so that an output terminal of the multi-level switching network outputs square wave voltages with different amplitudes in the different working modes or in the different working manners of one working mode, to serve as input voltages of a resonant unit, where the input voltage is used to adjust a gain of the resonant converter.

In this embodiment of this application, a gain can be adjusted by adjusting an input voltage, with no need to excessively increase a frequency, thereby reducing impact of an excessively high working frequency on the resonant converter, and improving efficiency and load capacity of the resonant converter.

The processor 510 controls operations of the control apparatus 50. The processor 510 may also be referred to as a Central Processing Unit (CPU). The memory 550 may include a read-only memory and a random access memory, and provide an operation instruction and data to the processor 510. A part of the memory 550 may further include a non-volatile random access memory (NVRAM). During specific application, components of the control apparatus 50 are coupled together through a bus system 520. In addition to a data bus, the bus system 520 may include a power bus, a control bus, a status signal bus, and the like. However, for clear description, various types of buses in the figure are marked as the bus system 520.

The method disclosed in the foregoing embodiments of the present application may be applied to the processor 510, or implemented by the processor 510. The processor 510 may be an integrated circuit chip and is capable of signal processing. In an implementation process, the operations in the foregoing method can be implemented by using a hardware integrated logic circuit in the processor 510, or by using instructions in a form of software. The processor 510 may be a general-purpose processor, a digital signal processor (DSP), an application-specific integrated circuit (ASIC), a field programmable gate array (FPGA) or other programmable logic devices, a discrete gate or a transistor logic device, or a discrete hardware component. The processor 510 can implement or perform the methods, operations, and logical block diagrams disclosed in the embodiments of the present application. The general-purpose processor may be a microprocessor, or the processor may be any conventional processor or the like. The operations of the methods disclosed with reference to the embodiments of the present application may be directly performed and completed by using a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 550, and the processor 510 reads information in the memory 550 and completes the operations of the foregoing methods in combination with hardware of the processor.

In one embodiment, the processor 510 is configured to:

when the working parameter includes a required output voltage of the multi-level switching network or a required gain of the resonant converter, determine, based on a voltage range in which the required output voltage is located, a working mode to which the multi-level switching network is to switch; or determine, based on a gain range in which the required gain of the resonant converter is located, a working mode to which the multi-level switching network is to switch; and determine the control instruction based on the working mode to which the multi-level switching network is to switch.

In one embodiment, the processor 510 is further configured to:

control the multi-level switching network to work in the different working modes periodically, or control the multi-level switching network to work in the different working manners of one working mode within one control period.

In one embodiment, the processor 510 is configured to:

control the N resonant converter apparatuses to work in the different working modes or in the different working manners of one working mode.

To understand the foregoing descriptions about the control apparatus 50, refer to the descriptions about the control apparatus in FIG. 1 to FIG. 9. Details are not described herein again.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, through a coaxial cable, an optical fiber, or a digital subscriber line (DSL)) or wireless (for example, through infrared, radio, or a microwave) manner. The computer readable storage medium may be any usable medium accessible by a computer, or a data storage device such as a server or a data center, including one or more usable media by integration. The usable medium may be a magnetic medium (for example, a floppy disk, a hard disk, or a magnetic tape), an optical medium (for example, a DVD), a semiconductor medium (for example, a Solid State Disk (SSD)), or the like.

A person of ordinary skill in the art can understand that all or some of the operations of the methods in the foregoing embodiments may be implemented by a program instructing relevant hardware. The program may be stored in a computer readable storage medium. The storage medium may include a ROM, a RAM, a magnetic disk, an optical disc, or the like.

The resonant converter, the power conversion system, and the resonant converter control method, the control apparatus and the computer readable storage medium provided in the embodiments of this application have been described in detail. The principles and implementations of this application are described in this specification through examples. The descriptions about the foregoing embodiments are merely provided to help understand the method and core ideas of this application. In addition, a person of ordinary skill in the art can make variations and modifications to the implementations and application scopes according to the ideas of this application. Therefore, the content of this specification shall not be construed as limitations on this application.

What is claimed is:

1. A resonant converter comprising:
an input power supply, a bleeder circuit, a multi-level switching network, a resonant unit, and a transformer, wherein a positive electrode and a negative electrode of the input power supply are respectively connected to two ends of the bleeder circuit, and the bleeder circuit is configured to divide a direct current voltage that is inputted by the input power supply;
two input terminals of the multi-level switching network are connected to the two ends of the bleeder circuit, respectively, a clamping middle point of the multi-level switching network is connected to a middle point of the bleeder circuit, and a quantity of output levels at an output terminal of the multi-level switching network is greater than 3;
one end of the resonant unit is connected to the output terminal of the multi-level switching network, and the other end of the resonant unit is connected to one end of a primary side of the transformer, and the other end of the primary side of the transformer is connected to the middle point of the bleeder circuit;
the multi-level switching network works in different working modes or in different working manners of one working mode according to control instructions of a control apparatus, wherein the control instructions are provided by the control apparatus based on a working parameter of the resonant converter, and the control apparatus is located in a power conversion system including the resonant converter, wherein the bleeder circuit comprises a capacitor C1 and a capacitor C2 that are connected in series, and the C1 and the C2 equally share a voltage of the input power supply E, the multi-level switching network comprises: a switching transistor Q1, a switching transistor Q2, a switching transistor Q3, a switching transistor Q4, a bilateral switch, and a capacitor C3, and the bilateral switch comprises at least one of a first bilateral switch and a second bilateral switch, the Q1, the Q2, the Q3, and the Q4 are sequentially connected in series in a same direction, and the Q1, the Q2, the Q3, and the Q4 in series are connected between the positive electrode and the negative electrode of the input power supply and when the quantity of output levels of the multi-level switching network is 5, the multi-level switching network comprises: a first bridge arm, a second bridge arm, and the capacitor C3, wherein the first bridge arm comprises the switching transistor Q1, the switching transistor Q2, the switching transistor Q3, and the switching transistor Q4, and the second bridge arm comprises a switching transistor Q5, a switching transistor Q6, a switching transistor Q7, and a switching transistor Q8; the Q1, the Q2, the Q3, and the Q4 are sequentially connected in series in a same direction, the Q1, the Q2, the Q3, and the Q4 in series are connected between the positive electrode and the negative electrode of the input power supply, a connection point between the Q1 and the Q2 is a first connection point, a connection point between the Q2 and the Q3 is a second connection point, a connection point between the Q3 and the Q4 is a third connection point, and the second connection point is connected to a middle point of the bleeder circuit the Q5, the Q6, the Q7, and the Q8 are sequentially connected in series in a same direction, and the Q5, the Q6, the Q7, and the Q8 in series are connected between the first connection point and the third connection point and a connection point between the Q6 and the Q7 serves as the output terminal of the multi-level switching network to connect to the one end of the resonant unit, a positive electrode of the C3 is connected to a connection point between the Q5 and the Q6, a negative electrode of the C3 is connected to a connection point between the Q7 and the Q8, and a voltage between the two ends of the C3 is E/4; and the output terminal of the multi-level switching network outputs square wave voltages with different amplitudes in the different working modes or in the different working manners of one working mode, to serve as input voltages of the resonant unit, wherein the input voltages are used to adjust a gain of the resonant converter.

2. The resonant converter according to claim 1, wherein the first bilateral switch comprises a semiconductor transistor Q5 and a switching transistor Q6 that are connected in reverse series, and the second bilateral switch comprises a switching transistor Q7 and a semiconductor transistor Q8 that are connected in reverse series;

one end of the first bilateral switch is connected to a connection point between the Q1 and the Q2, and the other end of the first bilateral switch is connected to the middle point of the bleeder circuit;

one end of the second bilateral switch is connected to a connection point between the Q3 and the Q4, and the other end of the second bilateral switch is connected to the middle point of the bleeder circuit; and a positive electrode of the C3 is connected to the connection point between the Q1 and the Q2, and a negative electrode of the C3 is connected to the connection point between the Q3 and the Q4; and a connection point between the Q2 and the Q3 serves as the output terminal of the multi-level switching network to connect to the one end of the resonant unit, and a voltage between the two ends of the C3 is E/4.

3. The resonant converter according to claim 2, wherein when the Q5 is a switching transistor, an emitter of the Q5 is connected to an emitter of the Q6, and a collector of the Q5 is connected to the middle point of the bleeder circuit;

when the Q5 is a diode, an anode of the Q5 is connected to an emitter of the Q6, and a cathode of the Q5 is connected to the middle point of the bleeder circuit;

when the Q8 is a switching transistor, an emitter of the Q8 is connected to an emitter of the Q7, and a collector of the Q8 is connected to the negative electrode of the C3, or when the Q8 is a diode, an anode of the Q8 is connected to an emitter of the Q7, and a cathode of the Q8 is connected to the negative electrode of the C3.

4. The resonant converter according to claim 2, wherein when the quantity of output levels is 5, the five output levels comprise E/2, E/4, 0, E/4, and E/2;

the five output levels are combined to form 10 square wave voltages with different amplitudes; and the 10 square wave voltages with different amplitudes are comprised in four working modes, and square wave voltages in different working manners of one working mode have a same level difference between amplitudes.

5. The resonant converter according to claim 1, wherein the bleeder circuit comprises a capacitor C1 and a capacitor C2 that are connected in series, and the C1 and the C2 equally share a voltage of the input power supply E; and the multi-level switching network comprises: a switching transistor Q1, a switching transistor Q2, a switching transistor Q3, a semiconductor transistor, a bilateral switch, and a capacitor C3, wherein the Q1, the Q2, and the Q3 are sequentially connected in series in a same direction, and the Q1, the Q2, and the Q3 in series are connected between the positive electrode and the negative electrode of the input power supply;

one end of the bilateral switch is connected to a connection point between the Q2 and the Q3, and the other end of the bilateral switch is connected to a negative electrode of the C3; a positive electrode of the C3 is connected to a connection point between the Q1 and the Q2; and when the semiconductor transistor is a switching transistor Q4, a collector of the Q4 is connected to the negative electrode of the C3, and an emitter of the Q4 is connected to a middle point of the bleeder circuit, or when the semiconductor is a diode, an anode of the diode is connected to the middle point of the bleeder circuit, and a cathode of the diode is connected to the negative electrode of the C3; or one end of the bilateral switch is connected to a connection point between the Q1 and the Q2, and the other end of the bilateral switch is connected to a positive electrode of the C3; a negative electrode of the C3 is connected to a connection point between the Q2 and the Q3; and when the semiconductor transistor is a switching transistor Q4, an emitter of the Q4 is connected to the positive electrode of the C3, and a collector of the Q4 is connected to the middle point of the bleeder circuit, or when the semiconductor is a diode, an anode of the diode is connected to the positive electrode of the C3, and a cathode of the diode is connected to the middle point of the bleeder circuit.

6. The resonant converter according to claim 1, wherein there are M multi-level switching networks and M resonant units, wherein M is an integer greater than 1, and the multi-level switching networks are driven in turn with a timing phase difference of 360°/M; and an output terminal of each of the multi-level switching networks is connected to one end of each of the resonant units in a one-to-one manner, and the other end of each of the resonant units is connected to the one end of the primary side of the transformer.

7. The resonant converter according to claim 6, wherein there are M transformers, and the other end of each of the resonant units is connected to one end of a primary side of each of the transformers in a one-to-one manner.

8. A control method for controlling a resonant converter, wherein the resonant converter comprises: an input power supply, a bleeder circuit, a multi-level switching network, a resonant unit, and a transformer, wherein a positive electrode and a negative electrode of the input power supply are respectively connected to two ends of the bleeder circuit, and the bleeder circuit is configured to divide a direct current voltage that is input by the input power supply; two input terminals of the multi-level switching network are respectively connected to the two ends of the bleeder circuit, a clamping middle point of the multi-level switching network is connected to a middle point of the bleeder circuit, and a quantity of output levels at an output terminal of the multi-level switching network is greater than 3; one end of the resonant unit is connected to the output terminal of the multi-level switching network, and the other end of the resonant unit is connected to one end of a primary side of the transformer; and the other end of the primary side of the transformer is connected to the middle point of the bleeder circuit, wherein the bleeder circuit comprises a capacitor C1 and a capacitor C2 that are connected in series, and the C1 and the C2 equally share a voltage of the input power supply E, the multi-level switching network comprises: a switching transistor Q1, a switching transistor Q2, a switching transistor Q3, a switching transistor Q4, a bilateral switch, and a capacitor C3, and the bilateral switch comprises at least one of a first bilateral switch and a second bilateral switch, the Q1, the Q2, the Q3, and the Q4 are sequentially connected in series in a same direction, and the Q1, the Q2, the Q3, and the Q4 in series are connected between the positive electrode and the negative electrode of the input power supply, and when the quantity of output levels of the multi-level switching network is 5, the multi-level switching network comprises: a first bridge arm, a second bridge arm, and the capacitor C3, wherein the first bridge arm comprises the switching transistor Q1, the switching transistor Q2, the switching transistor Q3, and the switching transistor Q4, and the second bridge arm comprises a switching transistor Q5, a switching transistor Q6, a switching transistor Q7, and a switching transistor Q8; the Q1, the Q2, the Q3, and the Q4 are sequentially connected in series in a same direction, the Q1, the Q2, the Q3, and the Q4 in series are connected between the positive electrode and the negative electrode of the input power supply, a connection point between the Q1 and the Q2 is a first connection point, a connection point between the Q2 and the Q3 is a second connection point, a connection point between the Q3 and the Q4 is a third connection point, and the second connection point is connected to a middle point of the bleeder circuit the Q5, the Q6, the Q7, and the Q8 are sequentially connected in series in a same direction, and the Q5, the Q6, the Q7, and the Q8 in series are connected between the first connection point and the third connection point and a connection point between the Q6 and the Q7 serves as the output terminal of the multi-level switching network to connect to the one end of the resonant unit, a positive electrode of the C3 is connected to a connection point between the Q5 and the Q6, a negative electrode of the C3 is connected to a connection point between the Q7 and the Q8, and a voltage between the two ends of the C3 is E/4; and, the resonant converter control method comprises:

obtaining, by a control apparatus, a working parameter of the resonant converter, wherein the control apparatus is located in a power conversion system comprising the resonant converter; and determining, by the control apparatus, a control instruction based on the working parameter, wherein the control instruction is used to instruct the multi-level switching network to work in different working modes or in different working manners of one working mode, so that the output terminal of the multi-level switching network outputs square wave voltages with different amplitudes in the different working modes or in the different working manners of one working mode, to serve as input voltages of the resonant unit, wherein the input voltages are used to adjust a gain of the resonant converter.

9. The control method according to claim 8, wherein the working parameter comprises a required output voltage of the multi-level switching network or a required gain of the resonant converter; and the determining, by the control apparatus, a control instruction based on the working parameter comprises:

determining, by the control apparatus based on a voltage range in which the required output voltage is located, a working mode to which the multi-level switching network is to switch; or determining, by the control apparatus based on a gain range in which the required gain of the resonant converter is located, a working mode to which the multi-level switching network is to switch; and determining, by the control apparatus, the control instruction based on the working mode to which the multi-level switching network is to switch.

10. The control method according to claim 9, wherein the control method further comprises:

controlling, by the control apparatus, the multi-level switching network to work in the different working modes periodically, or controlling the multi-level switching network to work in the different working manners of one working mode in one control period.

11. The control method according to claim 8, the control method further comprises:

controlling, by the control apparatus, N resonant converter apparatuses to work in different working modes or in different working manners of one working mode.

* * * * *

UNITED STATES PATENT AND TRADEMARK OFFICE
CERTIFICATE OF CORRECTION

PATENT NO. : 11,159,089 B2
APPLICATION NO. : 16/911023
DATED : October 26, 2021
INVENTOR(S) : Yanzhong Zhang et al.

Page 1 of 1

It is certified that error appears in the above-identified patent and that said Letters Patent is hereby corrected as shown below:

In the Claims

In Claim 1, Column 22, Line 66, delete "of the bleeder circuit the Q5," and insert --of the bleeder circuit; the Q5,--.

In Claim 8, Column 25, Line 33, delete "of the bleeder circuit the Q5," and insert --of the bleeder circuit; the Q5,--.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*